United States Patent
Wang et al.

(10) Patent No.: US 7,551,806 B2
(45) Date of Patent: Jun. 23, 2009

(54) TWO STAGE INTERPOLATION APPARATUS AND METHOD FOR UP-SCALING AN IMAGE ON DISPLAY DEVICE

(75) Inventors: Ghy-Bin Wang, Jung-Li (TW); Ming-Sung Huang, Hsinchu (TW); Inn Shing Liu, Hsinchu (TW)

(73) Assignee: Etron Technology, Inc., Hsin-Chu (TW)

( * ) Notice: Subject to any disclaimer, the term of this patent is extended or adjusted under 35 U.S.C. 154(b) by 434 days.

(21) Appl. No.: 11/191,762

(22) Filed: Jul. 28, 2005

(65) Prior Publication Data

US 2007/0025644 A1  Feb. 1, 2007

(51) Int. Cl.
G06K 9/32 (2006.01)
G06F 15/00 (2006.01)
H04N 1/46 (2006.01)

(52) U.S. Cl. .......... 382/300; 358/1.2; 358/525

(58) Field of Classification Search ......... 382/298–300, 382/302, 305; 358/1.2, 525, 528; 345/519, 345/606, 130, 530, 558; 348/581, 500
See application file for complete search history.

(56) References Cited

U.S. PATENT DOCUMENTS

| | | | |
|---|---|---|---|
| 4,988,984 A | 1/1991 | Gonzalez-Lopez | 340/728 |
| 5,739,867 A | 4/1998 | Eglit | 348/581 |
| 5,784,047 A | 7/1998 | Cahill, III et al. | 345/127 |
| 5,850,207 A | 12/1998 | Eglit | 345/132 |
| 5,889,529 A | 3/1999 | Jones et al. | 345/439 |
| 6,002,446 A * | 12/1999 | Eglit | 348/581 |
| 6,014,125 A | 1/2000 | Herbert | 345/127 |
| 6,115,507 A * | 9/2000 | Eglit et al. | 382/300 |
| 6,577,778 B1 | 6/2003 | Wu et al. | 382/300 |
| 6,594,404 B1 | 7/2003 | Smith | 382/298 |
| 2002/0154123 A1 | 10/2002 | Harasimiuk | 345/472 |
| 2003/0085912 A1 | 5/2003 | Soo et al. | 345/698 |
| 2003/0174148 A1 | 9/2003 | Chia et al. | 345/660 |
| 2003/0198399 A1 | 10/2003 | Atkins | 382/261 |
| 2004/0179030 A1 | 9/2004 | Cole et al. | 345/698 |

OTHER PUBLICATIONS

"Scattered Data Interpolation Methods for Electronic Imaging Systems: A Survey", Amidros, Jrnl. of Elec. Imaging, vol. 11, Issue 2, pp. 157-176, Apr. 2002.
"Survey: Interpolation Methods in Medical Image Processing", Nov. 1999, vol. 18, Issue 11, pp. 1049-1075
"Arbitrarily Scalable Edge-Preserving Interpolation for 3-D Graphics and Video Resizing", Lee et al., The 2001 IEEE Int'l Symp. on Circuits and Sys., vol. 2, pp. 317-320.

* cited by examiner

*Primary Examiner*—Kanji Patel
(74) *Attorney, Agent, or Firm*—Saile Ackerman LLC; Stephen B. Ackerman; Billy Knowles

(57) ABSTRACT

A graphics display adapter has a row interpolator circuit connected to receive the source pixel data synchronized at a first clock rate and to interpolate groups of pixels of row at a second clock rate. A row interpolated storage device receives and retains interpolated source pixel data of each row at the second clock rate. A column interpolator circuit extracts the interpolated source pixel data at a third clock rate. The column interpolator circuit then interpolates groupings of the interpolated source pixel data at the third clock rate and transmits the destination graphic pixel data for display. The second clock rate maybe equal to the first clock rate or the faster of the first and third clock rates.

55 Claims, 10 Drawing Sheets

FIG. 1 – Prior Art

TWO STAGE INTERPOLATION APPARATUS AND METHOD FOR UP-SCALING AN IMAGE ON DISPLAY DEVICE

BACKGROUND OF THE INVENTION

1. Field of the Invention

This invention relates generally to methods and apparatus for manipulating graphical image data for presentation on a graphical display. More particularly, this invention relates to methods and apparatus for up-scaling graphical image data intended for presentation on a display with a lower resolution to graphical image data for presentation on a display with a higher resolution. Even more particularly, this invention relates to methods and apparatus for up-scaling graphical image data by interpolation of the horizontal pixel image data followed by interpolation of the vertical pixel image data.

2. Description of Related Art

Conventional devices for presenting a graphics image include such display devices as computer monitors (CRT displays, flat panel LCD displays, or plasma displays), projectors, or other imaging system. These devices produce a displayed image by addressing an array of individual picture elements or pixels arranged in ranks of horizontal rows and vertical columns. The resolution of the displayed image is defined as the number of horizontal rows and vertical columns of individual pixels forming the displayed image. The resolution of the displayed image is determined by the resolution of the display device onto which the image data is intended to be displayed.

The display devices have a preferred operational mode or display mode. The term display mode refers to the characteristics of a display device, in particular the maximum number of colors and the maximum image resolution (in pixels horizontally by pixels vertically). There are several display modes are presently used in display devices. The present most common display modes in use include the Video Graphics Array (VGA), the Extended Graphics Array (XGA), the Super Video Graphics Array (SVGA), the Super Extended Graphics Array (SXGA) and Ultra Extended Graphics Array (UXGA). Table 1 shows display modes and the resolution levels (in pixels horizontally by pixels vertically) most commonly associated with each.

TABLE 1

| Display Mode | Resolution (pixels) |
|---|---|
| VGA | 640 × 480 |
| SVGA | 800 × 600 |
| XGA | 1024 × 768 |
| SXGA | 1280 × 1024 |
| UXGA | 1600 × 1200 |

Often, the resolution of the image data and the resolution of the display device differ. In the cases where the image data is stored at a resolution less than the display device, the image will under fill the display device and there will be blank spaces horizontally and vertically from the presented image. In some instances the image maybe stored in a standard 4:3 aspect ratio, but need to be presented on a display device that has a standard 16:9 aspect ratio. Again, this difference in image resolution and aspect ratio causes the image to not fit onto the display device appropriately. To fill the display device the image data must be up-scaled. Conventionally the image data must be interpolated between the pixels of each row of image data to add pixels to the row and then the rows of image pixel data are interpolated to add needed rows of image pixel data.

U.S. Pat. No. 5,739,867 (Eglit) describes an up-scaler for up-scaling a source image to generate a destination image without having to maintain the aspect ratio (ratio of the length of the source image to that of the width) of the source image. The source image pixel data is received at a first clock rate and the destination image is generated at a second clock rate. The second clock rate is computed such that the frame rate at which the source image is received is the same as the frame rate at which the up-scaled image is generated. Because of such a clock rate, the up-scaler may be implemented only a line buffer for up-scaling a source image.

The operation of the up-scaler of Eglit is shown in FIG. 1. The source pixel data 5 is applied to the input data synchronizer 10 using source clock timing signals 7 SCLK and sends the synchronized source pixel data to line buffer 20 synchronized at the rate determined by the source clock timing signals 7 SCLK. However, the rate of data flow is the same at the input and output sides of input data synchronizer 10 and corresponds to the rate of the source clock timing signals 7 SCLK.

The line buffer 20 receives synchronized image pixel data at the same data flow rate as the output rate of input data synchronizer 10 and transfers the synchronized image pixel data to the first-in-first out serial memory (FIFO) 25 at a rate determined by the destination clock timing signals 15 DCLK.

The output is the first-in-first out serial memory 25 is then transferred to the interpolator line buffer 30 and the vertical interpolator 35. The interpolator line buffer 30 retains at least one complete horizontal line grouping of pixel image data for interpolation with an incoming horizontal line grouping of pixel image data. The vertical interpolator 35 performs an appropriate interpolation function to add the necessary lines to the pixel image data for filling the vertical space of the display device. The vertically interpolated data is then transferred from the vertical interpolator to the horizontal interpolator 40. The transfer of the synchronized pixel image data to the vertical interpolator from the first-in-first out serial memory 25 and the interpolator line buffer 30 is at the rate of the destination clocking signals 15. Further, the vertical interpolation operations of the vertical interpolator 35 are performed at the rate of the rate of the destination clocking signals 15.

The horizontal interpolator receives the vertically interpolated pixel image data, the interpolation operation and transfers the interpolated pixel image data as the destination pixel image data 45 at the intermediate speed data flow rate of the destination clocking signals 15 to the display device control circuitry.

"Scattered Data Interpolation Methods for Electronic Imaging Systems: A Survey", Amidror, Journal of Electronic Imaging, Vol. 11, Issue 2, pp.: 157-176, April 2002, describes methods for scattered data interpolation in two-dimensional and in three-dimensional spaces for electronic imaging systems. The methods described include linear interpolation, bilinear interpolation methods, bicubic interpolation methods, triangulation interpolation methods, tetrahedrization interpolation methods, inverse distance weighted interpolation methods, radial basis function interpolation methods; and natural neighbor interpolation methods.

"Survey: Interpolation Methods in Medical Image Processing", Lehmann, et al., IEEE Transactions on Medical Imaging, 1999, Volume: 18, Issue: 11, pp: 1049-1075, describes image interpolation techniques that are required in medical imaging for image generation (e.g., discrete back projection for inverse Radon transform) and processing such as compression or resampling. Since the ideal interpolation function spatially is unlimited, several interpolation kernels of finite size have been introduced. Lehman et al. compares 1) truncated and windowed sine; 2) nearest neighbor; 3) linear; 4) quadratic; 5) cubic B-spline; 6) cubic; g) Lagrange; and 7) Gaussian interpolation and approximation techniques with kernel sizes from 1×1 up to 8×8. The comparison is done by: 1) spatial and Fourier analyses; 2) computational complexity as well as runtime evaluations; and 3) qualitative and quantitative interpolation error determinations for particular interpolation tasks which were taken from common situations in medical image processing.

"Arbitrarily Scalable Edge-Preserving Interpolation for 3-D Graphics and Video Resizing", Lee, The 2001 IEEE International Symposium on Circuits and Systems—ISCAS 2001, Volume: 2, pp.: 317-320, teaches proposes an edge-preserving interpolation algorithm that can perform arbitrary scaling. The algorithm utilizes a band-split approach with weighted selection direction interpolation.

U.S. Pat. No. 4,988,984 (Gonzalez-Lopez) illustrates an image interpolator that implements an interpolation function providing real time, continuous zoom capability to an image display system. Output image pixels are obtained by interpolating the values of the color or intensity of the 2×2 matrix of pixels surrounding the point on the input image. The interpolator employs a bi-linear interpolation algorithm implemented in the form of cascaded one-dimensional interpolation circuits. Magnification control is established so that a unit increment of the zoom controller, such as a cursor on a tablet, results in a constant increase in the degree of magnification. The coefficients required for the interpolation are generated in real time avoiding the need for time consuming table look-ups.

U.S. Pat. No. 5,784,047 (Cahill, III, et al.) describes a display scaler device. The display scaler device includes a memory for sending data, a first variable length buffer for receiving the data from the memory. A first scaler scales the data in a first direction. A buffer controller controls the first buffer and a memory controller controls sending of the data from the memory to the first variable length buffer. A main display controller sends control signals to the first scaler, the buffer controller, and the memory controller. The display scaler may further include a second buffer for receiving the scaled data from the first scaler and a second scaler for scaling the scaled data in a second direction. The display scaler generates a first image on a first display window and a second image on a second display window. The method may send a first data corresponding to a portion of the first image then store the first data in a first storage. A second data corresponding to a portion of the second image is sent and stored in a second storage. Some of the first data vertically and horizontally is scaled and transmitted for display, and then some of the second data is scaled vertically and horizontally and transmitted for display.

U.S. Pat. No. 5,850,207 (Eglit) provides a display controller to up-scale a source video image for display on a display unit of a computer system. An encoder circuit stores in a local memory pixel data of previous scan lines required for interpolation in a compressed format using differential pulse code modulation (DPCM) scheme. As a part of the DPCM scheme, encoder generates a predicted value for each source video pixel data as a function of at least one prior pixel data value in the scan line. However, when a slope over load condition is encountered, the decoder circuit changes the predicted value for a subsequent pixel data value to a different value, which may enable the graphics controller circuit to avoid a slope overload condition as to subsequent pixel data values. A decoder circuit decompresses the pixel data into original format prior to sending to an interpolator. The interpolator receives a present scan line and the decompressed data of previous scan lines, and interpolates the received pixels to generate additional pixels required for up-scaling the source video image. When a slope overload condition is encountered, an override circuitry causes the interpolator to use for interpolation a pixel data value in the present scan line instead of the pixel data value causing the slope overload condition.

U.S. Pat. No. 5,889,529 (Jones, et al.) teaches a system and method for dynamically resizing graphic images of variable image complexity to generate display images at a constant frame rate for output to a display device. In one frame, an image resolution is determined and a graphic image is drawn to the determined image resolution. In the subsequent frame, the graphic image is magnified to a target resolution prior to being output to a display device. The synchronization of the drawing of the graphic image and its display is managed by a swap buffer signal. The graphic images and their corresponding image resolutions are double buffered. The multiple channels are independently dynamic resized such that multiple display devices can independently resize graphic images of variable complexity at a constant frame rate.

U.S. Pat. No. 6,014,125 (Herbert) describes a scaling apparatus for horizontally and vertically scaling scan line information stored in a video memory prior to providing the scan line information to a computer display. Horizontal scaling apparatus is provided in which a first clock signal is provided for graphics portions of scan lines and a second clock signal is provided for video portions of scan lines. The second clock signal is enabled in a manner such that the second clock signal exhibits a predetermined phase relationship with respect to the first clock signal from scan line to scan line. The frequency of the second clock signal is selected to determine the scaling of the video portion of the scan line. Vertical scaling apparatus is provided in which scan line information corresponding to first and second scan lines is retrieved from a video memory. A digital differential analyzer, external to the central processing unit, then determines respective weights for the first and second scan lines dependent on the amount of vertical scaling desired. The weights for the first and second scan lines are then provided to a weighted adder which adds the first and second scan lines according to these weights.

U.S. Pat. No. 6,594,404 (Smith) illustrates a method and apparatus for resizing a digital video image composed of a plurality of source pixels which are resized to a plurality of target pixels. The method employs a technique which expresses the point brightness energy associated with each source pixel as an area which spans two source pixel intervals, each the area span having a shape which is proportional to the energy distribution of the source pixel with time; creating for each target pixel a sample aperture of duration which is a function of the resizing factor, sampling the area spans with each sample aperture to provide, for each target pixel, a set of coefficients, each coefficient representing the proportion of an area span which is within the sample aperture; and scaling, with its associated coefficient, the amount of point brightness energy of each source pixel whose area span appears within any given sample aperture.

U.S. Pat. No. 6,577,778 (Wu, et al.) illustrates a method and apparatus that provides for interpolating a digital image in response to a requested degree of sharpness. An adjusting signal representing the requested degree of sharpness will then be generated. The interpolated pixel data are computed based on a 3 order or 4 order interpolation function for three sampling input pixels with an adjustable weight coefficient representing the selected degree of sharpness. The apparatus mainly includes: a control interface, a control unit, a vertical interpolation computation module, and a horizontal interpolation module. The vertical interpolation computation module and the horizontal interpolation module are implemented according to an interpolation function derived by the present invention. The control unit comprises a lookup table built according to a scaling function. The vertical scaling factor and the horizontal scaling factor required for the interpolation function can be obtained by looking up the lookup table according to the adjusting signal, and the position of the interpolated pixel. The degree of sharpness is controlled without having to implement an additional sharp control circuit.

U.S. Patent Application 2002/0154123A1 (Harasimiuk) illustrates a method and a system for scaling a digital source image consisting of a grid of X by Y pixels into a target image of a different resolution. The method includes mapping the source pixels onto the target pixels. The method further includes scaling the source image in the X or Y direction to produce intermediate pixels that are scaled in one direction by determining contributions to each intermediate pixel using a digital filter. The contributions for each intermediate pixel are accumulated. Each source pixel contributes to one or more intermediate pixels and each intermediate pixel receives contributions from one or more source pixels; and subsequently scaling the intermediate pixels in the other direction by determining the contributions to each target pixel using the filter and accumulating the contributions for each target pixel. Each intermediate pixel contributes to one or more target pixels and each target pixel receives contributions from one or more intermediate pixels.

U.S. Patent Application 2003/0085912A1 (Soo, et al.) describes a system and method for image scaling interpolation. Input image pixel amplitude data is received at an input pixel resolution and image pixel amplitude data in one or two dimensions is output at a higher pixel resolution. User-programmable coefficients are selectable according to the nature and quality of the input image data such that sharpness of the output image data can be at least partially tailored to the image.

U.S. Patent Application 2003/0174148A1 (Chia, et al.) provides a method for scaling an image frame by an off-screen technology. An image frame consisting of n rows and m columns of data is stored into a storage device. The image frame is divided into a plurality of image portions. Then, the plurality of image portions are picked in sequence to a frame buffer register. An image scaling operation is performed for each picked image portion, and then the scaled image portion is cleared from the frame buffer register.

U.S. Patent Application 2003/0198399A1 (Atkins) describes a method for image scaling for image scaling that begins by selecting an input pixel from a first image. An input edge characteristic is determined from an input window associated with the input pixel. The input edge characteristic is determined from a plurality of predetermined edge characteristics that are associated with sets of filter coefficient vectors. An output window is generated by filtering the input window with a corresponding set of filter coefficients associated with the input edge characteristic. An output image is generated by repeating the above for a plurality of input pixels associated with the first image.

U.S. Patent Application 2004/0179030A1 (Cole, et al.) teaches a method for displaying an image having a first aspect ratio with a display device having a second aspect ratio. The method includes receiving image data for the image, buffering the image data and creating a frame of the image at the first aspect ratio, defining a first sub-frame and a second sub-frame for the frame of the image at the second aspect ratio, including spatially offsetting the second sub-frame from the first sub-frame in one direction, and alternating between displaying the first sub-frame in a first position and the second sub-frame in a second position spatially offset from the first position with the display device, including optically scaling a displayed image of the first sub-frame and a displayed image of the second sub-frame in the one direction.

SUMMARY OF THE INVENTION

An object of this invention is to provide a graphics display adapter for up-scaling graphic image pixel data intended for display on a lower resolution display to graphic image pixel data for display on a higher resolution display.

To accomplish at least this object, a graphic display adapter receives graphic signals with a first resolution less than a second resolution of graphic signals required by a display device in communication with the display adapter. The display adapter has a graphic up-scaling apparatus connected to receive source image pixel data of the graphic signals describing pixel intensity for pixels arranged in first dimensional ranks and second dimensional ranks. The first dimensional rank is a horizontal row and the second dimensional rank is a vertical column where source image pixel data is transferred and interpolated sequentially for each horizontal row vertically until an entire image has been interpolated.

The graphic up-scaling apparatus up-scales the source image pixel data to a higher pixel density for the first and second dimensional rank and transmits destination graphic pixel data that is the up-scaled source image data to a display. The graphic up-scaling apparatus has a first dimensional rank interpolator circuit. The first dimensional rank interpolator circuit is connected to receive the source pixel data synchronized at a first clock rate and to interpolate groups of pixels of each first dimensional rank of the source pixel data at a second clock rate. A first dimensional rank interpolated storage device is in communication with the first dimensional rank interpolator to receive and retain interpolated source pixel data of each first dimensional rank of the source pixel data at the second clock rate. A second dimensional rank interpolator circuit is in communication with the first dimensional rank interpolated storage device to extract the interpolated source pixel data of each first dimensional rank of the source pixel data at a third clock rate. The second dimensional rank interpolator circuit then interpolates groupings of the interpolated source pixel data of each first dimensional rank of the source pixel data at the third clock rate and transmits the destination graphic pixel data for display.

In one embodiment of this invention, the second clock rate is equal to the first clock rate such that the first dimensional rank interpolator interpolates the source pixel data at the first clock rate. In a second embodiment of this invention, the second clock rate is equal to a faster of the first clock rate and the third clock rate—such that the first dimensional rank interpolator interpolates the source pixel data at the faster of the first clock rate and the third clock rate. The third clock rate synchronizes the destination graphical pixel data for communication the destination graphical pixel data with the display.

The graphic display adapter further has a first dimensional rank generator in communication with the first dimensional rank interpolator circuit to generate and provide a first dimensional rank scaling factor by which groups of pixels of each first dimensional rank of the source pixel data are interpolated. The graphic display adapter additionally includes a second dimensional rank generator in communication with the second dimensional rank interpolator circuit to generate and provide a second dimensional rank scaling factor by which groupings of the interpolated source pixel data of each first dimensional rank of the source pixel data are interpolated.

The graphic display adapter has a clock rate generator to provide a first clock signal with the first clock rate and a second clock signal with the second clock rate communicated to the graphic up-scaling apparatus to synchronize the source pixel data, interpolate on the first dimensional rank and interpolate on the second dimensional rank the source pixel data. The graphic display adapter also includes a source pixel data synchronizer connected to receive the source pixel data, synchronize the source pixel data at the first clock rate, and communicate the synchronized source pixel data to the first dimensional rank interpolator.

In the first embodiment of this invention, the graphic up-scaling apparatus has a first-in-first-out serial memory buffer connected to buffer the source pixel data interpolated by the first dimensional rank interpolator as the interpolated source pixel data is placed in the first dimensional rank interpolated storage device. Alternately, in the second embodiment, the graphic up-scaling apparatus has a first-in-first-out serial memory buffer connected to buffer the source pixel data as it is transmitted from the source pixel data synchronizer to the first dimensional rank interpolator.

The graphic up-scaling apparatus graphic up-scaling apparatus further incorporates a clock selector to determine whether the first clock rate is faster than the third clock rate and set the third clock rate to the faster of the first clock rate and the third clock rate such that the first dimensional rank interpolator interpolates the source pixel data at the faster of the first clock rate and the third clock rate.

The first dimensional rank interpolator and the second rank interpolator employ an interpolation method may be linear interpolation methods, bilinear interpolation methods, bicubic interpolation methods, triangulation interpolation methods, tetrahedrization interpolation methods, inverse distance weighted interpolation methods, radial basis function interpolation methods; and natural neighbor interpolation methods.

DETAILED DESCRIPTION OF THE INVENTION

A graphics adapter of this invention receives either analog or digital graphical signals of a low resolution at a source clock signal rate required by the lower resolution graphical signals. The graphic adapter then, in a first embodiment, interpolates the first dimensional rank or horizontal row of the graphical signal at the source clock signal rate. The signals are then transferred through a FIFO to a processed interpolated image storage array at the clock signal rate of the destination graphical signals. The rows of the interpolated graphical signal are extracted from the processed interpolated image storage array and interpolated on the second dimensional rank or vertical column at the clock signal rate of the destination graphical signals. The destination graphical signals are then transferred to a display controller for presentation on the display.

In a second embodiment, the received graphical signals are synchronized at the source clock signal rate. The graphical signals are then horizontally interpolated at the faster of the source clock signal rate or the destination clock signal rate. The horizontally interpolated graphical signals are then written to an interpolated image storage device to accumulate multiple groupings or rows or the first or horizontal dimensional rank at the faster of the source clock signal rate or the destination clock signal rate. The multiple rows of the horizontally interpolated graphical signals are extracted from the interpolated image storage device at the destination clock signal rate and vertically interpolated at the destination clock signal rate. A clock selection device decides the faster of the source clock signal rate and the destination clock signal rate.

The graphics adapter has a scale generator that determines the horizontal and vertical scaling factors necessary for up-scaling the graphic signals for presentation on the graphic display.

Figure 2:
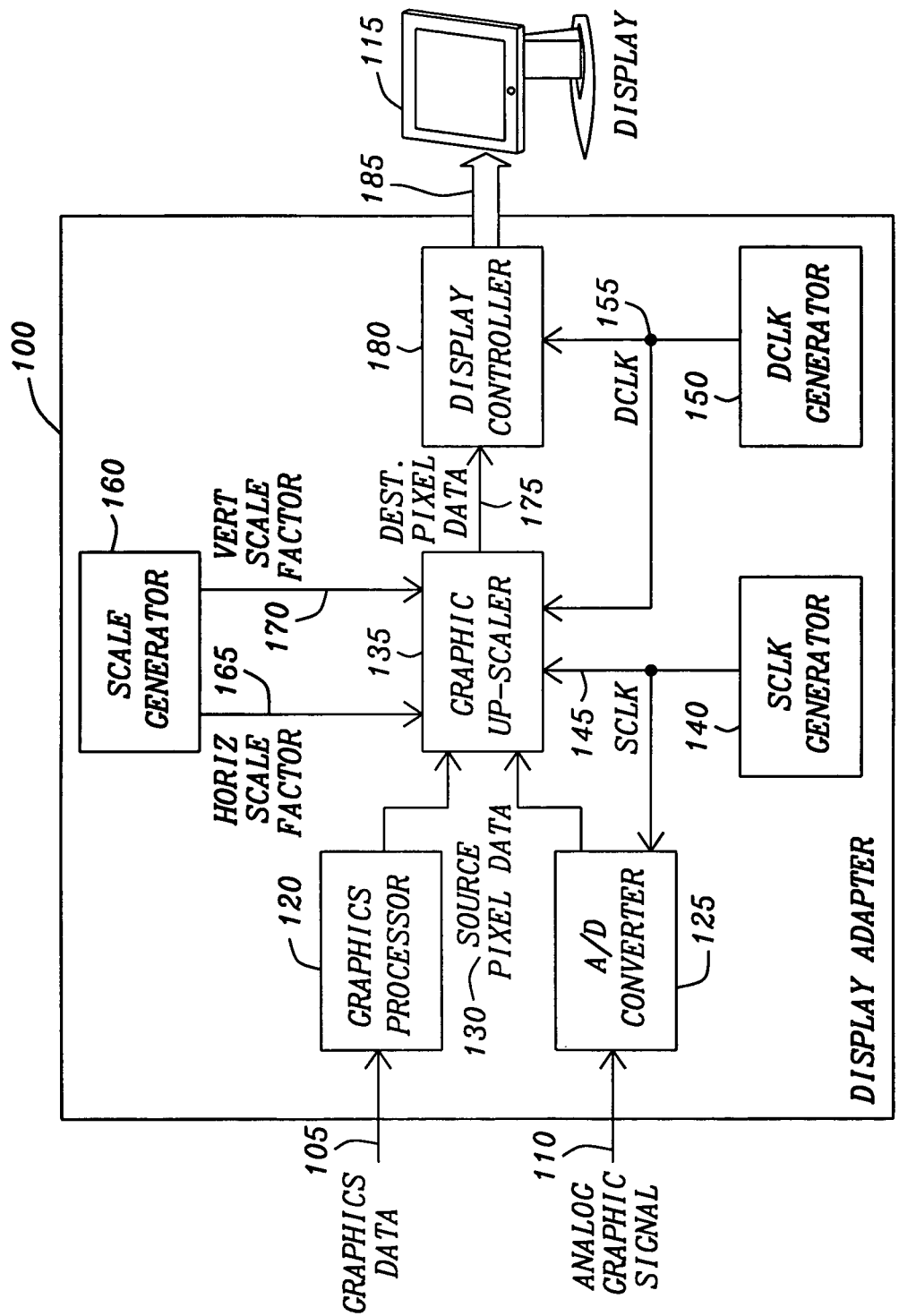
FIG. 2 is block diagram of a graphic display adapter of this invention.

Refer now to FIG. 2 for a more detailed description of the graphic display adapter of this invention. Digital or analog graphical signals 105 or 110 are applied to the graphic display adapter 100 of this invention. The digital graphical signals 105 are applied to the graphics processor 120 to be decoded and/or decompressed into the source graphic image pixel data 130. Alternatively, the analog graphical signal 110 is applied to an analog-to-digital converter 125. The analog graphical signal 110 is sampled at the source clock 145 rate and converted to a digital coding representing the intensity and color of the analog graphical signal. This digital coding is the source graphic image pixel data 130.

The source graphic image pixel data 130 is applied to the graphic up-scaler 135 for interpolation of each row of the source graphic pixel data followed by interpolation of the rows for the vertical interpolation. The source clock generator 140 produces the source clock SCLK 145 at a rate at which the source graphic image pixel data is synchronized. The destination clock generator 150 produces the destination clock DCLK 155 at a rate at which the destination pixel data is synchronized.

The scale generator 160 determines the resolution at which the source graphic image pixel data 130 is encoded and the resolution required of the display 115. From the resolution information, the scale generator 160 creates the horizontal scale factor 165 and the vertical scale factor 170 that are to be used respectively in the horizontal interpolation and the vertical interpolation of the graphic up-scaler 135. The source clock SCLK 145 and the destination clock DCLK are applied to the graphic up-scaler 135 for providing the appropriate timing rates for the horizontal and vertical interpolation. Upon the horizontal and vertical interpolation within the graphic up-scaler 135, the source graphic image pixel data 130 is transformed by up-scaling to the destination image pixel data 175 and transferred to the display controller 180 that converts the destination image pixel data 175 to the necessary drive and control signals 185 for the display 115.

Figure 3:
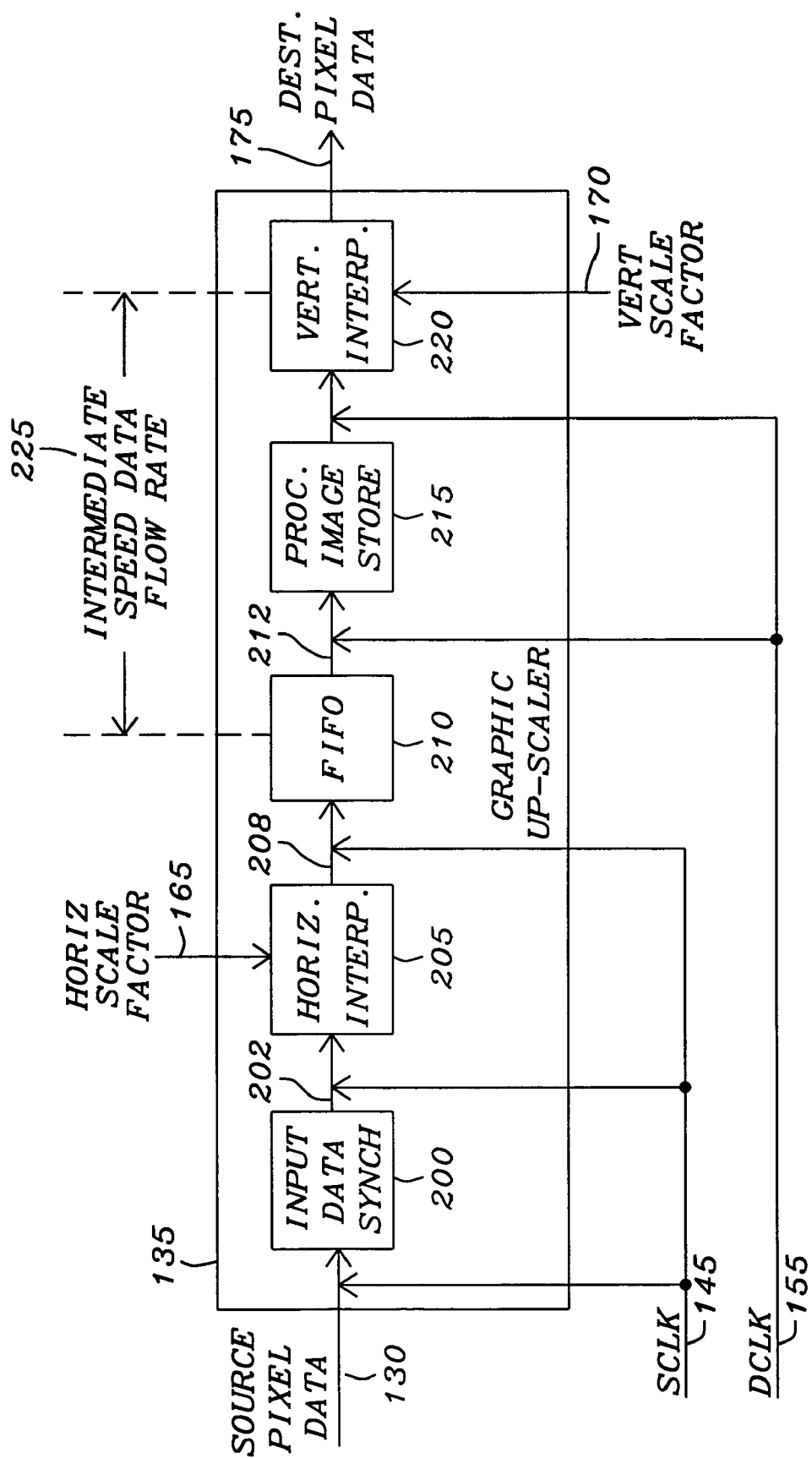
FIG. 3 is a block diagram of a first embodiment of an up-scaling apparatus of this invention.

Refer now to FIG. 3 for a discussion of the first embodiment of the graphic up-scaler 135 of this invention. The source graphic image pixel data 130 transmitted to the input data synchronizer 200 at the rate of the source clock signal 145. The input data synchronizer 200 synchronizes the source graphic image pixel data 130 and receives source graphic image pixel data 130 line by line and pixel by pixel. In the case of the analog input signal 110, the analog to digital converter 125 receives the recovered source clock SCLK 145 from a phase locked loop oscillator in the source clock generator 140 to recover the source clock then sample the analog input signal and convert it to digital format.

Figure 4:
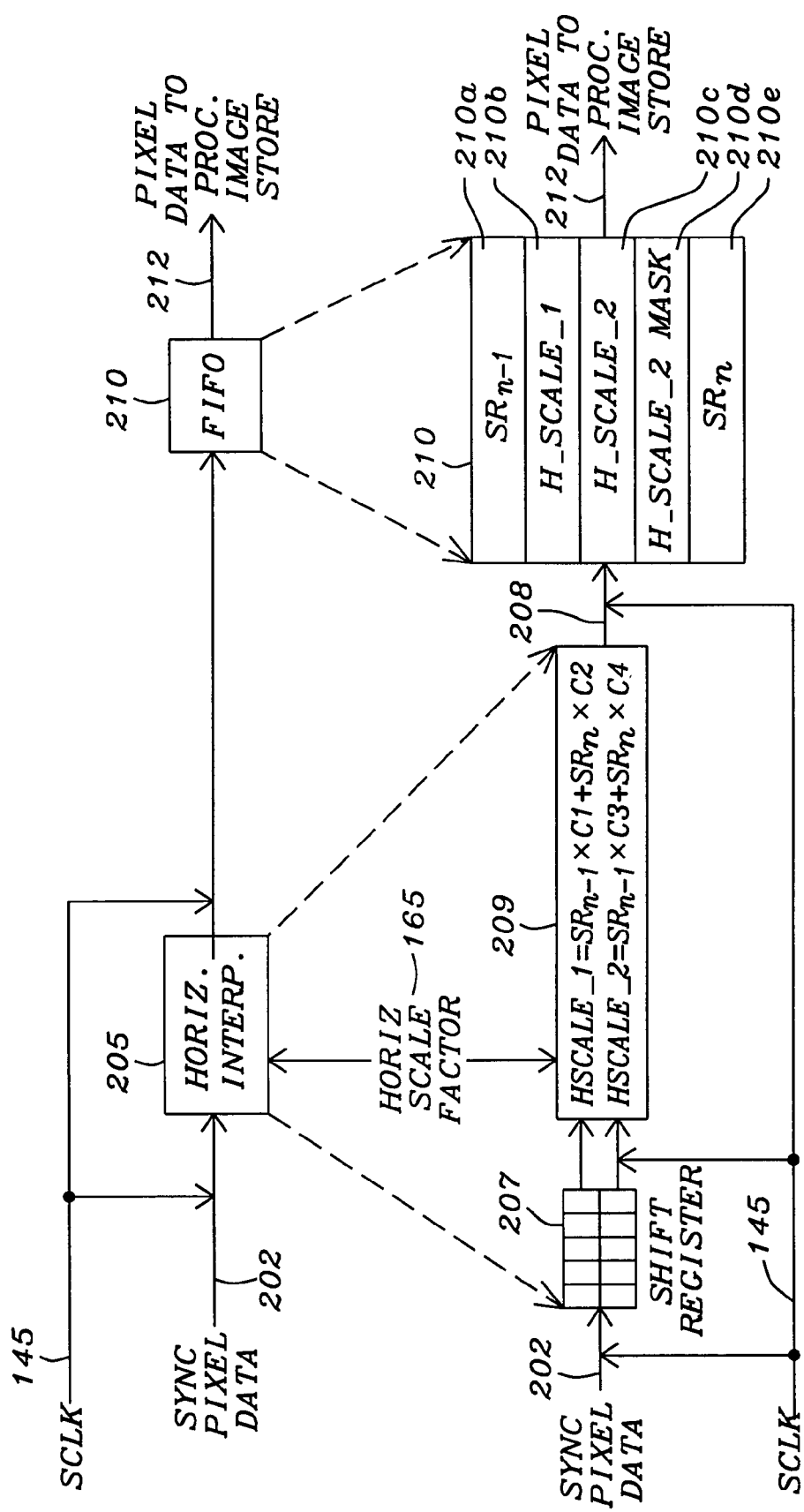
FIG. 4 is a block diagram of the horizontal interpolator and First-In-First-Out serial memory of the first embodiment of an up-scaling apparatus of this invention of FIG. 3.

The synchronized source graphic image pixel data 202 is then communicated to the horizontal interpolator 205 to interpolate the graphic image pixel data 130. The horizontal interpolator 205 receives the horizontal scale factor 165. The architecture of the horizontal interpolator is shown in FIG. 4. The shift register 207 receives the synchronized source graphic image pixel data 202. The horizontal scale factor 165 provides the interpolation coefficients C1, C2, C3, and C4 that are generated on a systematic way. The interpolation coefficients provide the necessary scaling factors for using any of the appropriate interpolation methods such as linear interpolation, bilinear interpolation methods, bicubic interpolation methods, triangulation interpolation methods, tetrahedrization interpolation methods, inverse distance weighted interpolation methods, radial basis function interpolation methods; or natural neighbor interpolation methods. Employing the desired interpolation method the horizontal interpolation circuit 209 scales each group of pixels of each horizontal row to generate the scaled source graphic image pixel data 208. The horizontal interpolation circuit 209 receives, dependent upon the horizontal scale factor 165 the number of pixels of the source graphic image pixel data from the shift register 207 required for the interpolation. The added pixels are then calculated by the formula:

$$HSCALE\_1 = SR_{n-1} \times C1 + SR_n \times C2$$

$$HSCALE\_2 = SR_{n-1} \times C3 + SR_n \times C4$$

Where:
HSCALE_1 is the value of the first pixel added between two pixels of the source graphic image pixel data 202.
HSCALE_2 is the value of the second pixel added between two pixels of the source graphic image pixel data 202.
$SR_{n-1}$ and $SR_{n-1}$ are the data values of the colors and intensities of the pixels of the horizontal row of the source graphic image pixel data 202 being interpolated.
C1, C2, C3, and C4 are the interpolation coefficients of the horizontal scaling factor 165.

The FIFO 210 retains the pixels $SR_{n-1}$ and $SR_{n-1}$ 210*a* and 210*e* of the source graphic image pixel data, the interpolated pixels HSCALE_1 and HSCALE_2 210*b* and 210*c*, and a bit mask HSCALE_2 MASK 210*d* at the rate of the source clock SCLK 145, when the interpolation coefficients C1, C2, C3, and C4 are all non-zero. If the interpolation coefficients C1, C2, C3, and C4 are set equal to zero, there is not interpolation between the horizontal pixels of the source graphic image pixel data 202 and these pixels are transferred directly to the FIFO 210 and the interpolated pixels HSCALE_1 and HSCALE_2 210*b* and 210*c* are not read from the FIFO 210. This indicates that the interpolated pixels HSCALE_1 and HSCALE_2 210*b* and 210*c* are empty and not to be used. If the interpolation coefficients C3 and C4 are zero, the bit mask HSCALE_2 MASK 210*d* is set to a one level indicating there is not second pixel value HSCALE_2 210*c* and this location is to be ignored.

The horizontal interpolation circuit 209 operates at the rate of the source clock SCLK 145 but the scaled up source graphic image pixel data now must have a higher data rate. To accommodate this higher data rate with the slower source clock SCLK 145, the output data path is two byte wide to support up to two times scaling up in horizontal direction.

Returning to FIG. 3, the horizontally interpolated source graphic image pixel data 212 is written to the interpolated processed image storage memory 215 at the rate of the destination clock DCLK 155. When several rows of the horizontally interpolated source graphic image pixel data 212 are written to the interpolated processed image storage memory 215, the rows of the horizontally interpolated source graphic image pixel data 212 necessary for the vertical interpolation are transferred to the vertical interpolator 220.

Figure 5:
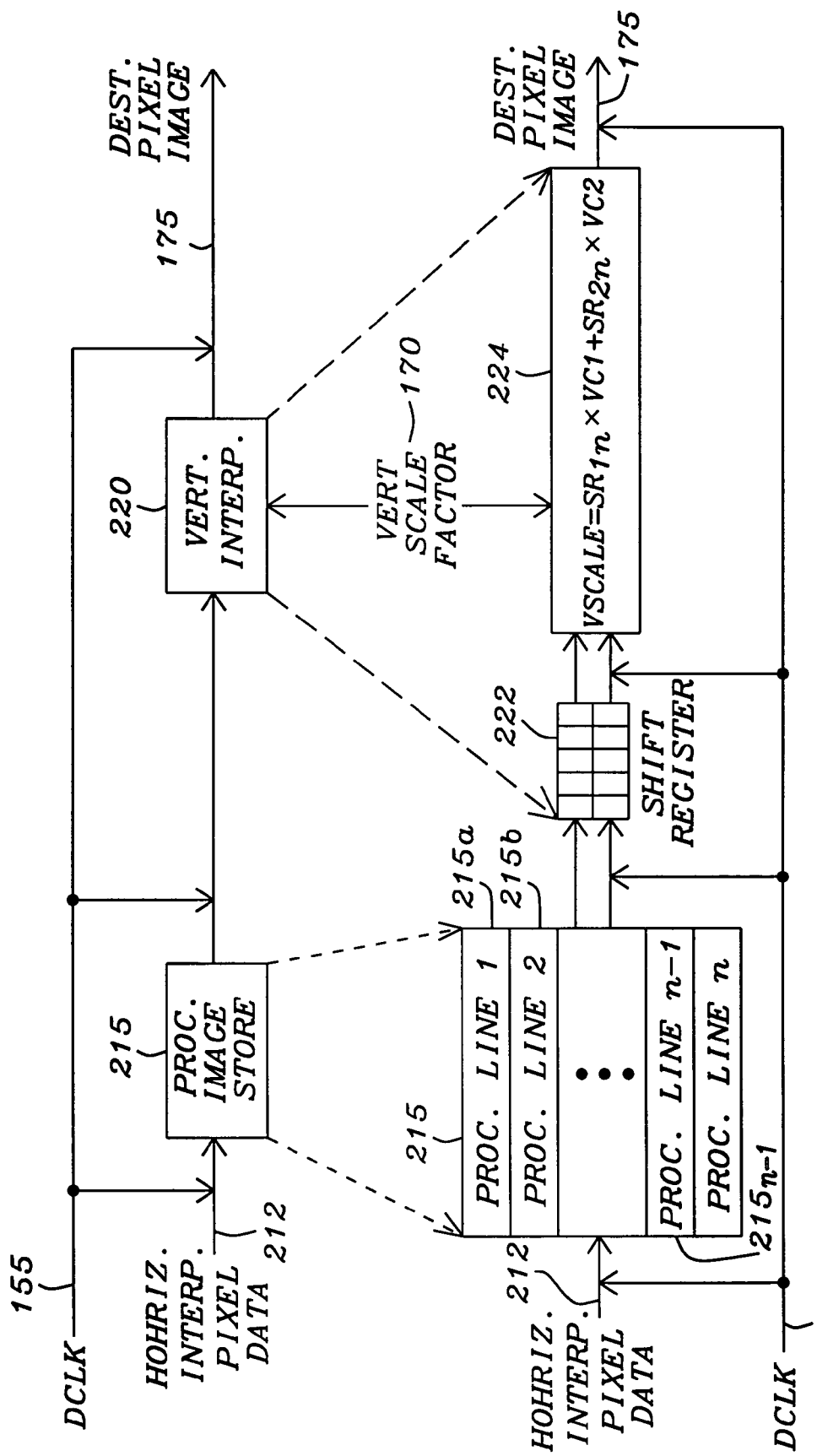
FIG. 5 is a block diagram of the process interpolated storage device and the vertical interpolator of the first embodiment of an up-scaling apparatus of this invention of FIG. 3.

Referring to FIG. 5 for a more detailed description of the vertical interpolation, each line or row of the horizontally interpolated source graphic image pixel data 212 is written to the row locations 215*a*, . . . , 215*n* of the interpolated processed image storage memory 215 at the rate of the destination clock DCLK 155. The interpolated processed image storage memory 215 acts as a line buffer used to store a multiple lines of horizontally interpolated source graphic image pixel data 212 from the FIFO 210. The size of the interpolated processed image storage memory 215 should match with the destination display resolution because the source graphic image pixel data is scaled horizontally before entering the interpolated processed image storage memory 215.

When sufficient rows of the horizontally interpolated source graphic image pixel data 212 are stored in the interpolated processed image storage memory 215, the vertical interpolator 220 reads two lines from the interpolated processed image storage memory 215 to the shift register 222. The shift register reads each vertical pair of pixels of the horizontally interpolated source graphic image pixel data 212 to the vertical interpolation circuit 224. The vertical interpolation circuit 224 then generates an interpolated pixel to be placed vertically between the two pixels of the horizontally interpolated source graphic image pixel data 212. The interpolation circuit receives the horizontal scale 170 from the scale generator 160 of FIG. 2 and generates the interpolated pixel according to the formula:

$$VSCALE = SR_{n-1} \times VC1 + SR_n \times VC2$$

Where:
VSCALE is the value of the first pixel added between two pixels of the horizontally interpolated source graphic image pixel data 212.
$SR_{n-1}$ and $SR_{n-1}$ are the data values of the colors and intensities of the pixels of the vertical column of the horizontally interpolated source graphic image pixel data 212 being interpolated.
VC1 and VC2 are the interpolation coefficients of the vertical scaling factor 170.

It should be noted that the up-scaling ratio of the vertical scaling factor 170 can be different from the up-scaling ratio of the horizontal scaling factor 165 and is not limited to a factor of two as confined in horizontal interpolator. Further, the interpolation coefficients VC1 and VC2 of the vertical scaling factor 170 may be the appropriate scaling factors for any appropriate interpolation methods such as linear interpolation, bilinear interpolation methods, bicubic interpolation methods, triangulation interpolation methods, tetrahedrization interpolation methods, inverse distance weighted interpolation methods, radial basis function interpolation methods; or natural neighbor interpolation methods. It should be further noted that the scaling factors are not limited to factors of two as shown for the horizontal interpolation device 209, but may be any scaling factor to provide the appropriate up-scaling of the source graphic image pixel data 202

Upon completion of the vertical interpolation 175, the horizontally and vertically interpolated source graphic image pixel data is transmitted as the destination image pixel data 175 to the display controller 180 of FIG. 2. The display controller 180 then converts the destination image pixel data 175 to the necessary drive and control signals 185 for the display 115.

Figure 6:
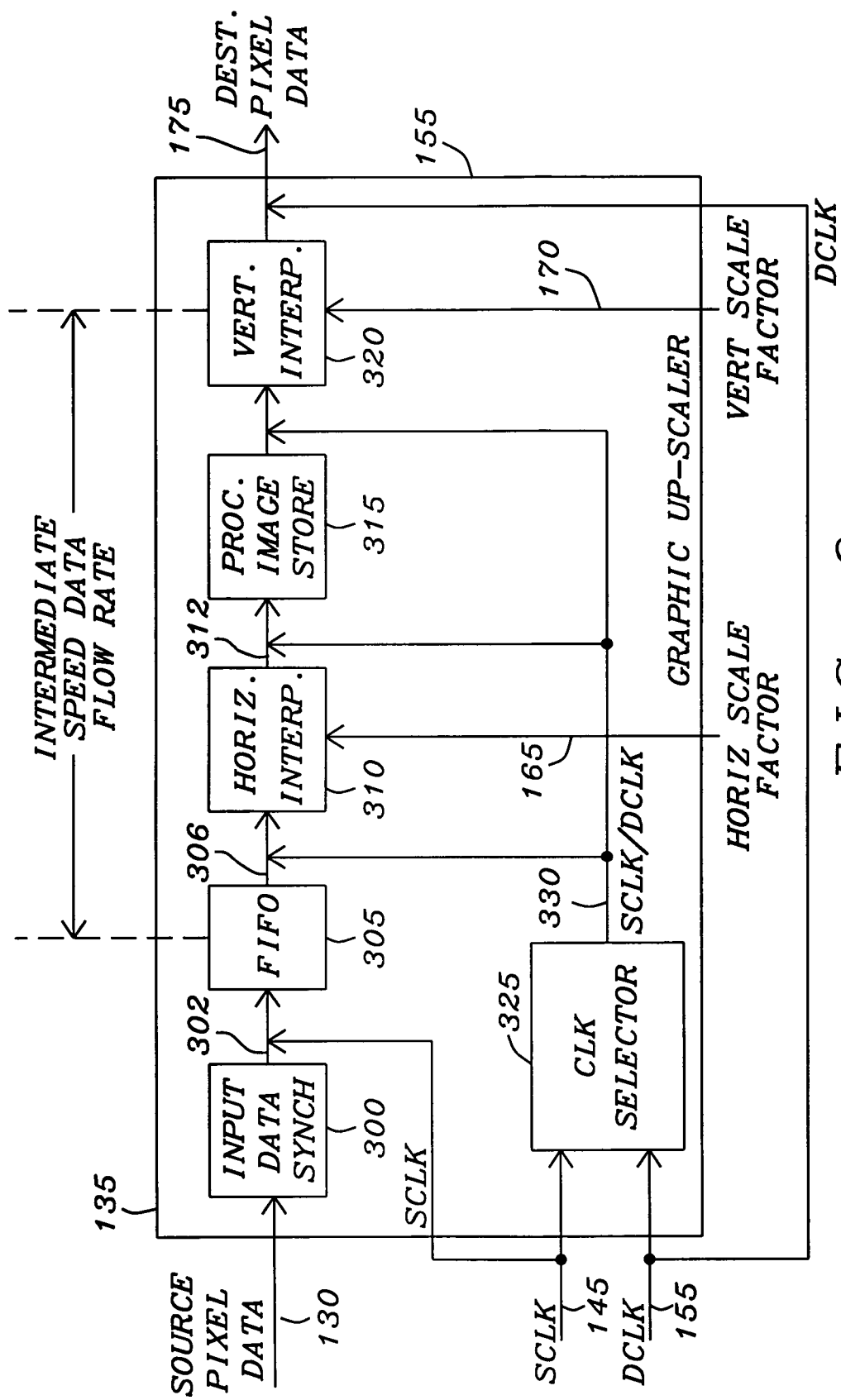
FIG. 6 is a block diagram of a second embodiment of an up-scaling apparatus of this invention.

Refer now to FIG. 6 for a discussion of the second embodiment of the graphic up-scaler 135 of this invention. The source graphic image pixel data 130 transmitted to the input data synchronizer 300 at the rate of the source clock signal 145. The input data synchronizer 300 synchronizes the source graphic image pixel data 130 and receives source graphic image pixel data 130 line by line and pixel by pixel. In the case of the analog input signal 110, the analog to digital converter 125 receives the recovered source clock SCLK 145 from a phase locked loop oscillator in the source clock generator 140 to recover the source clock then sample the analog input signal and convert it to digital format.

The synchronized source graphic image pixel data 302 is then communicated through the FIFO 305 to the horizontal interpolator 205 to interpolate the graphic image pixel data 130. The FIFO 305 is used to match the clock speed from output of the input data synchronizer 300 to the input of the horizontal interpolator 310. The synchronized source graphic image pixel data 302 is transferred to the input of the FIFO 305 at the rate of the source clock SCLK 145. The synchronized source graphic image pixel data 306 is then read from the FIFO at a rate that is determined to be the greater of the source clock CLK 145 or the destination clock rate 155 as determined by the clock selector 325. The faster clock 330 scans the synchronized source graphic image pixel data 306 to the horizontal interpolator 310.

Figure 7:
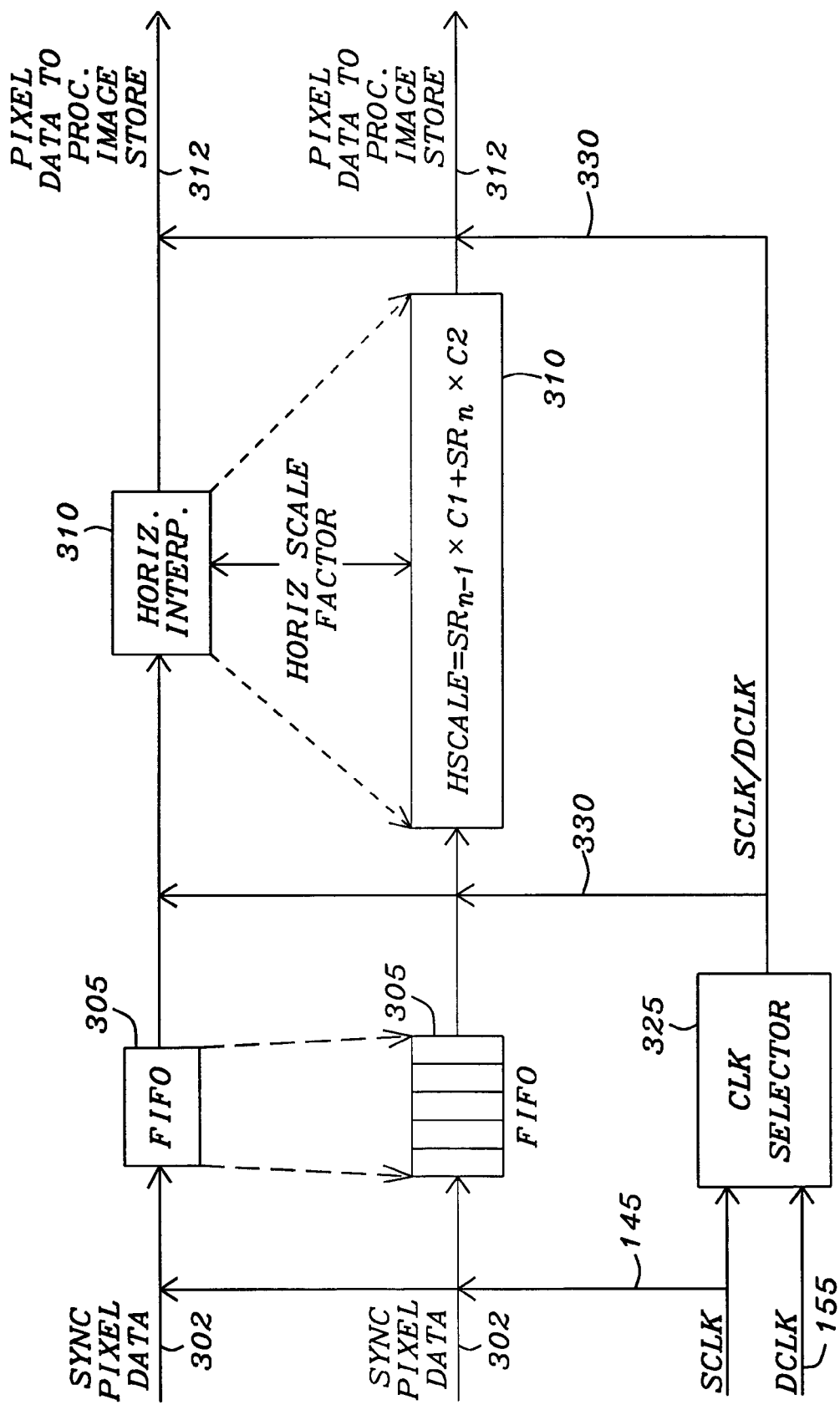
FIG. 7 is a block diagram of the First-In-First-Out serial memory and horizontal interpolator of the second embodiment of an up-scaling apparatus of this invention of FIG. 6.

The horizontal interpolator 310 receives the horizontal scale factor 165. The architecture of the horizontal interpolator 310 is as shown in FIG. 7. The FIFO 305 receives the synchronized source graphic image pixel data 302. The horizontal scale factor 165 provides the interpolation coefficients C1 and C2 are generated on a systematic way. The interpolation coefficients C1 and C2 provide the necessary scaling factors for using any of the appropriate interpolation methods such as linear interpolation, bilinear interpolation methods, bicubic interpolation methods, triangulation interpolation methods, tetrahedrization interpolation methods, inverse distance weighted interpolation methods, radial basis function interpolation methods; or natural neighbor interpolation methods. Employing the desired interpolation method the horizontal interpolation circuit 305 scales each group of pixels of each horizontal row to generate the scaled source graphic image pixel data 312. The horizontal interpolation circuit 305 receives, dependent upon the horizontal scale factor 165 the number of pixels of the source graphic image pixel data from the FIFO 305 required for the interpolation. The added pixels are then calculated by the formula:

$$HSCALE = SR_{n-1} \times C1 + SR_n \times C2$$

Where:
HSCALE is the value of the first pixel added between two pixels of the source graphic image pixel data 306.
$SR_{n-1}$ and $SR_{n-1}$ are the data values of the colors and intensities of the pixels of the horizontal row of the source graphic image pixel data 306 being interpolated.
C1 and C2 are the interpolation coefficients of the horizontal scaling factor 165.

The horizontal interpolator 310 performs the selected interpolation method on the synchronized source graphic image pixel data 306 at rate of the faster clock 330 as selected by the clock selector 325. The horizontally interpolated source graphic image pixel data 312 is transferred from the horizontal interpolator 315 at the rate of the faster clock 330 to the interpolated processed image storage memory 315.

Each line or row of the horizontally interpolated source graphic image pixel data 312 is written to the row locations of the interpolated processed image storage memory 315 at the rate of the faster clock 330. The interpolated processed image storage memory 315 acts as a line buffer used to store a multiple lines of horizontally interpolated source graphic image pixel data 312 from the horizontal interpolator 310. The size of the interpolated processed image storage memory 315 should match with the destination display resolution because the source graphic image pixel data is scaled horizontally before entering the interpolated processed image storage memory 315.

When sufficient rows of the horizontally interpolated source graphic image pixel data 312 are stored in the interpolated processed image storage memory 315, the vertical interpolator 320 reads two lines from the interpolated processed image storage memory 315 rate of the faster clock 330. The vertical interpolator 320 then generates an interpolated pixel to be placed vertically between the two pixels of the horizontally interpolated source graphic image pixel data 312. The interpolator circuit receives the horizontal scale 170 from the scale generator 160 of FIG. 2 and generates the interpolated pixel as described in FIG. 5. The vertical interpolator 320 then transfers the horizontally and vertically interpolated source graphic image pixel data as the destination image pixel data 175 to the display controller 180 of FIG. 2 for generating the necessary signals for presentation of the image on the display 115.

Figure 8:
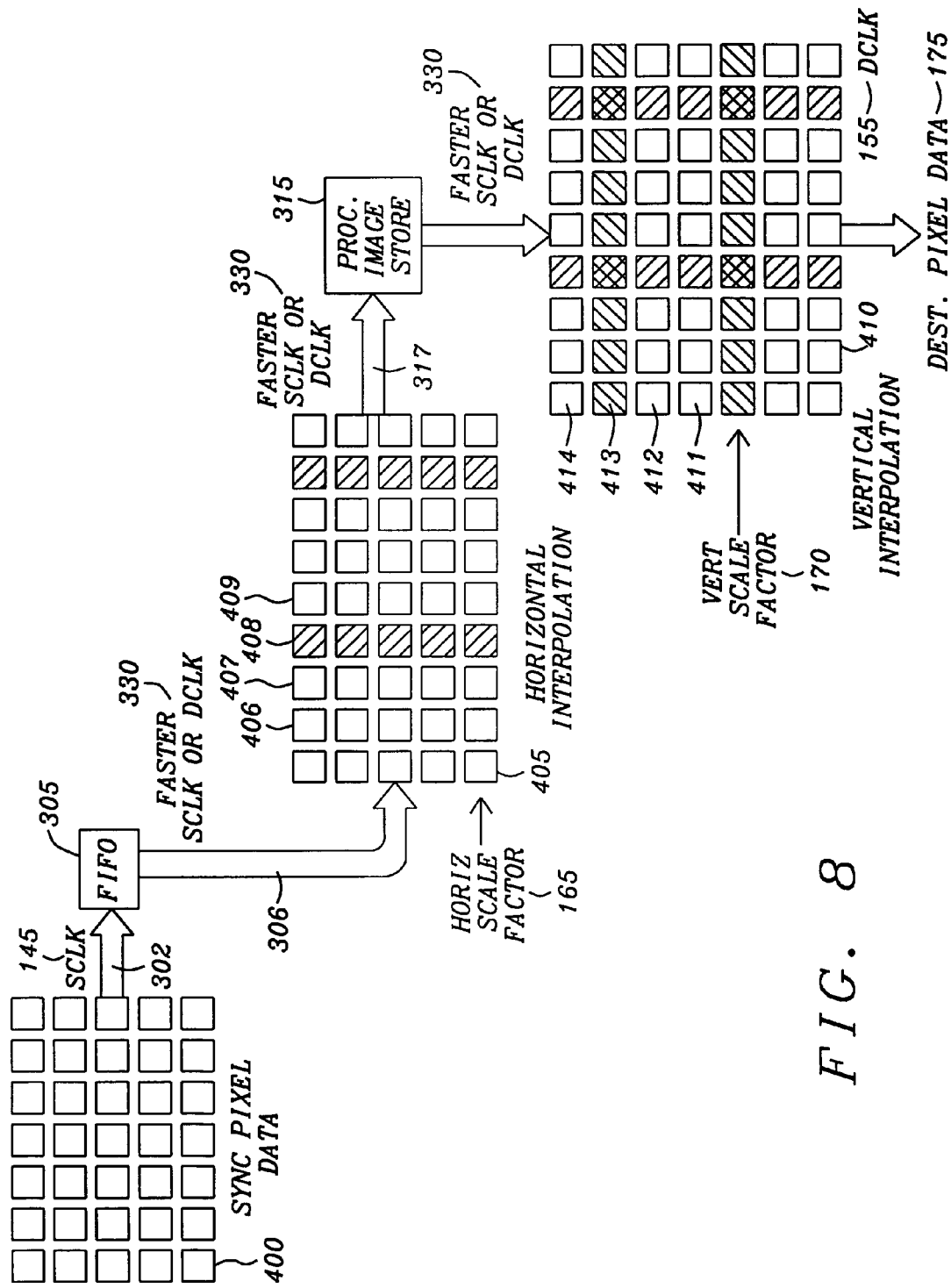
FIG. 8 is a diagram illustrating the function of the horizontal and the vertical interpolator of the second embodiment of an up-scaling apparatus of this invention of FIG. 6.

FIG. 8 illustrates the functioning of the second embodiment of this invention. The input data synchronizer 300 synchronizes the source graphic image pixel data 130 line by line and pixel by pixel at the speed of the source clock SCLK 145. The synchronized source graphic pixel data 400 is shown as the pixels as they would be displayed in columns and rows. Each row is transferred into the FIFO 305 at the rate of the source SCLK 145 and then transferred to the horizontal interpolator 310 of FIG. 6 for horizontal interpolation 405 at the rate of the faster clock 330. A pair of pixels of each row is read from the FIFO 305 and if there is to be an added pixel between the pair pixels, the horizontal interpolator 310 of FIG. 6 interpolates the value of the added pixel and the interpolated pixel is added. The horizontal scale factor provides the necessary interpolation coefficients based on the desired interpolation method as described above. In this illustration the horizontal ration is 4:3. That is the horizontally interpolated row has four pixels for every three pixels of each row. A pair of pixels 406 and 407 does not require an added pixel between them. The pixel data for these pixels is read from the FIFO and transferred directly to the horizontally interpolated processed image storage memory 315. Alternately, the pair of pixels 407 and 409 requires a pixel 408 to be added between them. The interpolation generates the value of the intensity of the pixel and inserts the necessary pixel data to be written to the horizontally interpolated processed image storage memory 315. The horizontally interpolated graphic image pixel data 317 is written to the horizontally interpolated processed image storage memory 315 at the rate of the faster clock 330.

The horizontally interpolated processed image storage memory 315, as described above, acts as a line buffer used to store a multiple lines of horizontally interpolated source graphic image pixel data 312 from the horizontal interpolator 310. The size of the horizontally interpolated processed image storage memory 315 should match with the destination display resolution because the source graphic image pixel data is scaled horizontally before entering the interpolated processed image storage memory 315. Pairs of rows of are read from the interpolated processed image storage memory 315 for vertical interpolation 410 by vertical interpolator 320 of FIG. 6. The vertical scale factor provides the vertical interpolation coefficients for determining the intensity of any pixel rows added to the image. In this example the ratio for the vertical scaling is 2:3. That is there will be one row of pixels added for every two rows of original pixel data.

Figure 1:
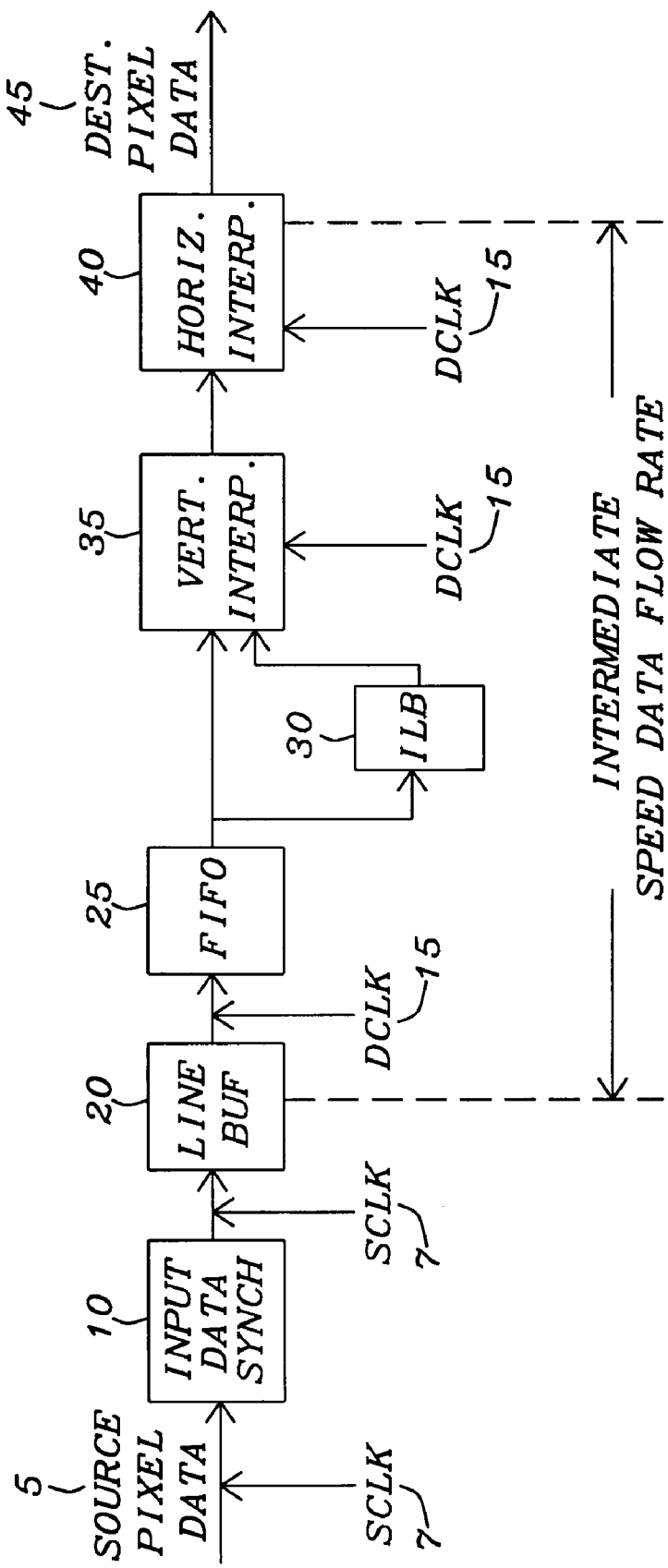
FIG. 1 is a block diagram of an up-scaling apparatus of the prior art.

When the pair of rows 411 and 412 are extracted from the horizontally interpolated processed image storage memory 315, there is to be no interpolation and the rows are read to the display controller 180 of FIG. 1 with no vertical interpolation. Alternately, with the pair of rows 412 and 414, the row 413 is to be added on a pixel by pixel basis by interpolating the values of each pair of pixels from the two rows 412 and 414 to generate the pixel 413. The vertical interpolation 410 is accomplished at the rate of the faster clock 330. The horizontally and vertically interpolated source graphic image pixel data is transferred as the destination image pixel data 175 to the display controller 180 of FIG. 2 for generating the necessary signals for presentation of the image on the display 115.

Figure 9:
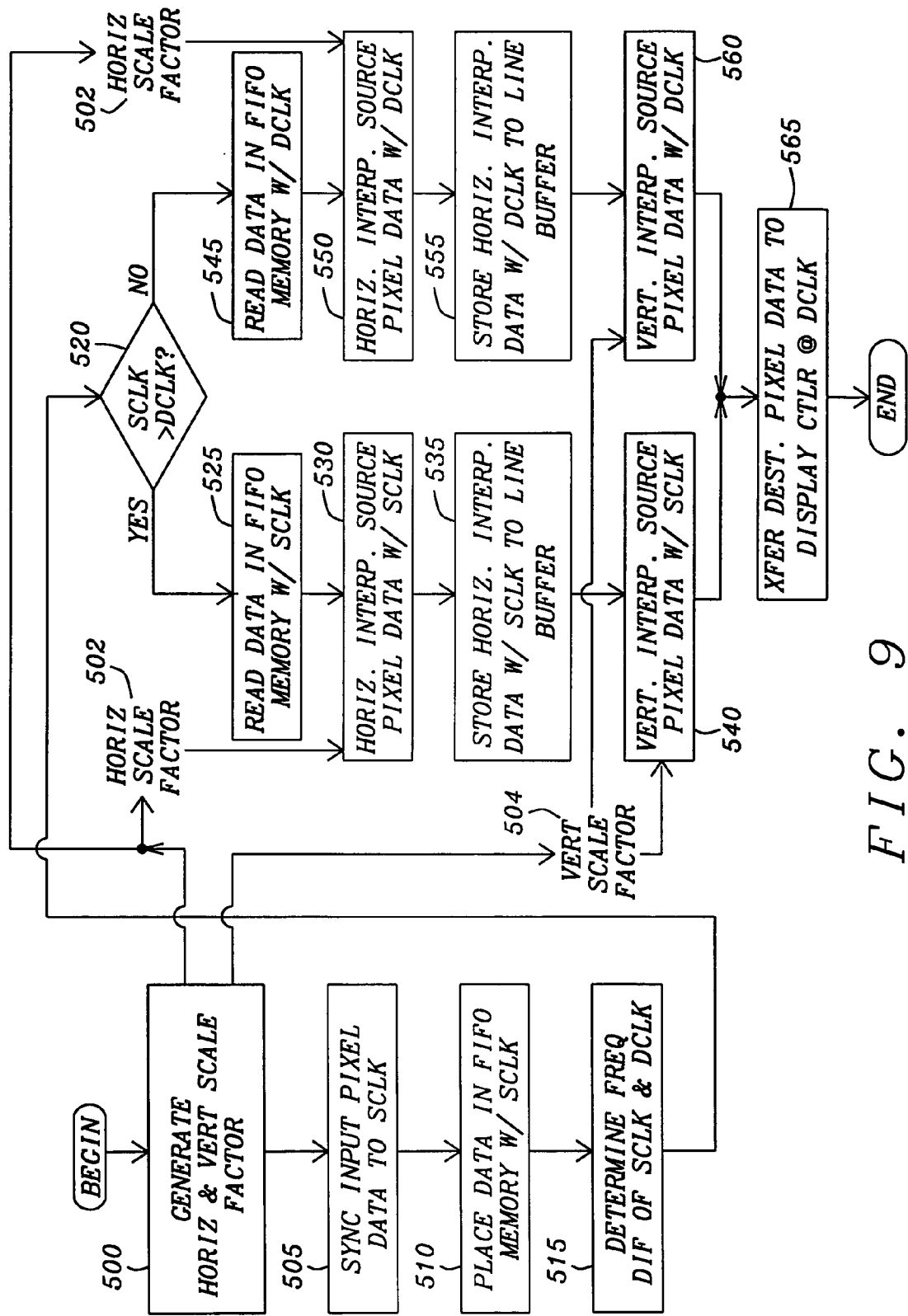
FIG. 9 is a flow diagram of a first embodiment of the method for up-scaling graphical image pixel data for presentation on a graphic display having a higher resolution that the source graphical image pixel data.

The graphic up-scaler 135 of FIG. 2 is described above as unique circuits and devices. However, this interpolation of the source graphic image pixel data to up-scale from a lower resolution code pixel data to higher resolution pixel data for presentation on a display can be accomplished in a computer process either in a computation processor of the graphic adapter or within a computer processor. The computation has an associated storage medium such as an electronic memory or optical or magnetic storage device for retaining a computer program. The computer program is then executed on a computing system to perform a program process for up-scaling source image pixel data describing pixel intensity for image pixels of a display. The program process is described by a first embodiment of the method for up-scaling graphical image pixel data for presentation on a graphic display having a higher resolution than that of the source graphical image pixel data of FIG. 9.

The first embodiment of the method for up-scaling graphical image pixel data begins by determining the resolution of the source graphical image pixel data and the display on which the image is to be presented to generate (Box 500) the horizontal and vertical scale factors 502 and 504. The source input pixel data is then synchronized (Box 505) with the source clock SCLK. The horizontal scale factor 502 provides the interpolation coefficients C1, C2, C3, and C4 are generated on a systematic way. The interpolation coefficients provide the necessary scaling factors for using any of the appropriate interpolation methods such as linear interpolation, bilinear interpolation methods, bicubic interpolation methods, triangulation interpolation methods, tetrahedrization interpolation methods, inverse distance weighted interpolation methods, radial basis function interpolation methods; or natural neighbor interpolation methods. Employing the desired interpolation method, the horizontal interpolation (Box 510) scales each group of pixels of each horizontal row to generate the scaled source graphic image pixel data at the rate of the source clock SCLK. The added pixels are then calculated by the formula:

$$HSCALE\_1 = SR_{n-1} \times C1 + SR_n \times C2$$

$$HSCALE\_2 = SR_{n-1} \times C3 + SR_n \times C4$$

Where:
HSCALE_1 is the value of the first pixel added between two pixels of the source graphic image pixel data.
HSCALE_2 is the value of the second pixel added between two pixels of the source graphic image pixel data.
$SR_{n-1}$ and $SR_{n-1}$ are the data values of the colors and intensities of the pixels of the horizontal row of the source graphic image pixel data being interpolated.
C1, C2, C3, and C4 are the interpolation coefficients of the horizontal scaling factor.

The pixels $SR_{n-1}$ and $SR_{n-1}$ of the source graphic image pixel data, the interpolated pixels HSCALE_1 and HSCALE_2, and a bit mask HSCALE_2 MASK are placed (Box 515) in the FIFO at the rate of the source clock SCLK, when the interpolation coefficients C1, C2, C3, and C4 are all non-zero. If the interpolation coefficients C1, C2, C3, and C4 are set equal to zero, there is not interpolation between the horizontal pixels of the source graphic image pixel data and these pixels are transferred (Box 515) directly to the FIFO and the interpolated pixels HSCALE_1 and HSCALE_2 are not read from the FIFO. This indicates that the interpolated pixels HSCALE_1 and HSCALE_2 are empty and not to be used. If the interpolation coefficients C3 and C4 are zero, the bit mask HSCALE_2 MASK is set to a one level indicating there is not second pixel value HSCALE_2 and this location is to be ignored.

The horizontal interpolation (Box 510) operates at the rate of the source clock SCLK but the scaled up source graphic image pixel data now must have a higher data rate. To accommodate this higher data rate with the slower source clock SCLK, the output data path is two byte wide to support up to two times scaling up in horizontal direction.

The horizontally interpolated source graphic image pixel data is read from the FIFO (Box 520) from the FIFO and written (Box 525) to the interpolated processed image storage memory at the rate of the destination clock DCLK. When several rows of the horizontally interpolated source graphic image pixel data are written to the interpolated processed image storage memory, the rows of the horizontally interpolated source graphic image pixel data necessary for the vertical interpolation are read interpolated processed image storage memory for vertical interpolation (Box 530). The size of the interpolated processed image storage memory 215 should match with the destination display resolution because the source graphic image pixel data is scaled horizontally before entering the interpolated processed image storage memory 215.

When sufficient rows of the horizontally interpolated source graphic image pixel data are stored in the interpolated processed image storage memory, the vertical interpolation (Box 530) reads two lines from the interpolated processed image storage memory to a shift register. The shift register reads each vertical pair of pixels of the horizontally interpolated source graphic image pixel data for vertical interpolation (Box 530). The vertical interpolation (Box 530) then generates an interpolated pixel to be placed vertically between the two pixels of the horizontally interpolated source graphic image pixel data. The vertical interpolation circuit uses the vertical scale 504 from the scale generation (Box 500) and generates the interpolated pixel according to the formula:

$$VSCALE = SR_{n-1} \times VC1 + SR_n \times VC2$$

Where:

VSCALE is the value of the first pixel added between two pixels of the horizontally interpolated source graphic image pixel data.

$SR_{n-1}$ and $SR_{n-1}$ are the data values of the colors and intensities of the pixels of the vertical column of the horizontally interpolated source graphic image pixel data being interpolated.

VC1 and VC2 are the interpolation coefficients of the vertical scaling factor.

It should be noted that the up-scaling ratio of the vertical scaling factor 504 can be different from the up-scaling ratio of the horizontal scaling factor 502 and is not limited to a factor of two as confined in horizontal interpolator. Further, the interpolation coefficients VC1 and VC2 of the vertical scaling factor 504 may be the appropriate scaling factors for any appropriate interpolation methods such as linear interpolation, bilinear interpolation methods, bicubic interpolation methods, triangulation interpolation methods, tetrahedrization interpolation methods, inverse distance weighted interpolation methods, radial basis function interpolation methods; or natural neighbor interpolation methods. It should be further noted that the scaling factors are not limited to factors of two as shown for the horizontal interpolation (Box 510), but may be any scaling factor to provide the appropriate up-scaling of the source graphic image pixel data.

Upon completion of the vertical interpolation (Box 530), the horizontally and vertically interpolated source graphic image pixel data is transmitted (Box 535) as the destination image pixel data to the display controller at the rate of the destination clock DCLK. The display controller then converts the destination image pixel data to the necessary drive and control signals for the display.

Figure 10:
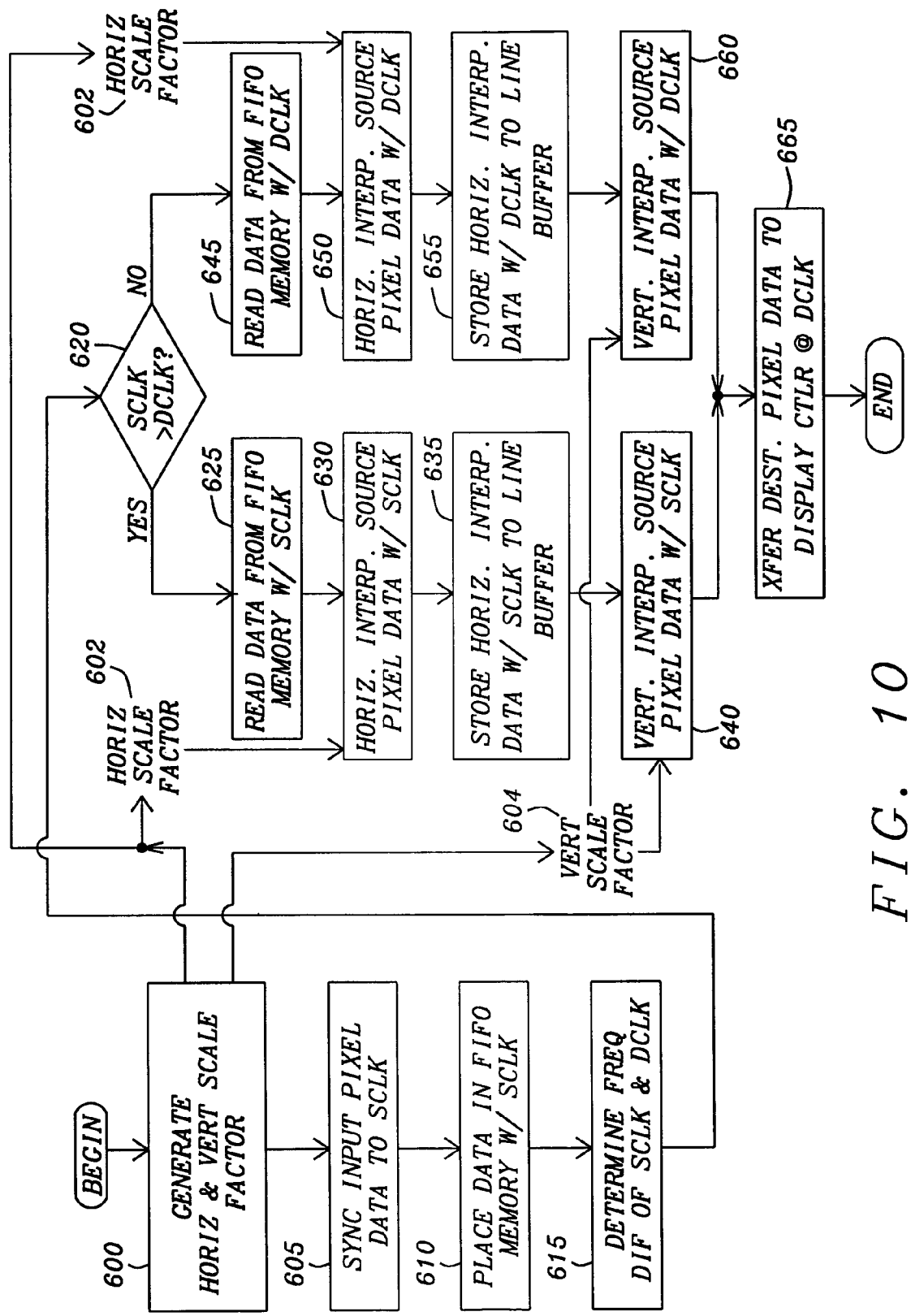
FIG. 10 is a flow diagram of a second embodiment of the method for up-scaling graphical image pixel data for presentation on a graphic display having a higher resolution that the source graphical image pixel data.

The program process is further described by a second embodiment of the method for up-scaling graphical image pixel data for presentation on a graphic display having a higher resolution than that of the source graphical image pixel data as shown in FIG. 10. The second embodiment of the method for up-scaling graphical image pixel data begins by determining the resolution of the source graphical image pixel data and the display on which the image is to be presented to generate (Box 600) the horizontal and vertical scale factors 602 and 604. The source input pixel data is then synchronized (Box 605) with the source clock SCLK. The synchronized source input pixel data is placed (Box 610) in a FIFO at the rate of the source clock SCLK to match the clock speed from input pixel data synchronization (Box 605) for horizontal interpolation.

The frequency difference of the source clock SCLK and the destination clock DCLK is determined (Box 615) and tested (Box 620) to determine if the source clock SCLK has a greater frequency rate than the destination clock DCLK. If the source clock SCLK has a greater rate than the destination clock DCLK, the input pixel data is read (Box 625) from the FIFO at the rate of the source clock SCLK for horizontal interpolation (Box 630).

The horizontal scale factor 602 provides the interpolation coefficients C1, C2, C3, and C4 are generated on a systematic way. The interpolation coefficients provide the necessary scaling factors for using any of the appropriate interpolation methods such as linear interpolation, bilinear interpolation methods, bicubic interpolation methods, triangulation interpolation methods, tetrahedrization interpolation methods, inverse distance weighted interpolation methods, radial basis function interpolation methods; or natural neighbor interpolation methods. Employing the desired interpolation method, the horizontal interpolation (Box 630) scales each group of pixels of each horizontal row to generate the scaled source graphic image pixel data at the rate of the source clock SCLK. The added pixels are then calculated by the formula:

$$HSCALE\_1 = SR_{n-1} \times C1 + SR_n \times C2$$

Where:

HSCALE_1 is the value of the first pixel added between two pixels of the source graphic image pixel data.

$SR_{n-1}$ and $SR_{n-1}$ are the data values of the colors and intensities of the pixels of the horizontal row of the source graphic image pixel data being interpolated.

C1 and C2 are the interpolation coefficients of the horizontal scaling factor.

The pixels $SR_{n-1}$ and $SR_{n-1}$ of the source graphic image pixel data, the interpolated pixels HSCALE_1 is stored (Box 635) in the FIFO at the rate of the source clock SCLK, when the interpolation coefficients C1, C2, C3, and C4 are all non-zero. If the interpolation coefficients C1 and C2 are set equal to zero, there is not interpolation between the horizontal pixels of the source graphic image pixel data and these pixels are transferred (Box 635) directly to the interpolated processed image storage memory at the rate of the source clock SCLK. When several rows of the horizontally interpolated source graphic image pixel data are written to the interpolated processed image storage memory, the rows of the horizontally interpolated source graphic image pixel data necessary for the vertical interpolation are read interpolated processed image storage memory for vertical interpolation (Box 640). The size of the interpolated processed image storage memory should match with the destination display resolution because the source graphic image pixel data is scaled horizontally before entering the interpolated processed image storage memory.

When sufficient rows of the horizontally interpolated source graphic image pixel data are stored in the interpolated processed image storage memory, the vertical interpolation (Box 640) reads two lines from the interpolated processed image storage memory to a shift register. The shift register reads each vertical pair of pixels of the horizontally interpolated source graphic image pixel data for vertical interpolation (Box 640). The vertical interpolation (Box 640) then generates, at the rate of the source clock SCLK, an interpolated pixel to be placed vertically between the two pixels of the horizontally interpolated source graphic image pixel data. The vertical interpolation uses the vertical scale 604 from the scale generation (Box 600) and generates the interpolated pixel according to the formula:

$$VSCALE = SR_{n-1} \times VC1 + SR_n \times VC2$$

Where:

VSCALE is the value of the first pixel added between two pixels of the horizontally interpolated source graphic image pixel data.

$SR_{n-1}$ and $SR_{n-1}$ are the data values of the colors and intensities of the pixels of the vertical column of the horizontally interpolated source graphic image pixel data being interpolated.

VC1 and VC2 are the interpolation coefficients of the vertical scaling factor.

It should be noted that the up-scaling ratio of the vertical scaling factor 604 can be different from the up-scaling ratio of the horizontal scaling factor 602 and is not limited to a factor of two as confined in horizontal interpolator. Further, the interpolation coefficients VC1 and VC2 of the vertical scaling factor 604 may be the appropriate scaling factors for any appropriate interpolation methods such as linear interpolation, bilinear interpolation methods, bicubic interpolation methods, triangulation interpolation methods, tetrahedrization interpolation methods, inverse distance weighted interpolation methods, radial basis function interpolation methods; or natural neighbor interpolation methods. It should be further noted that the scaling factors are not limited to factors of two as shown for the horizontal interpolation (Box 630), but may be any scaling factor to provide the appropriate up-scaling of the source graphic image pixel data.

If the destination clock DCLK has a greater rate than the source clock SCLK, the input pixel data is read (Box 645) from the FIFO at the rate of the destination clock DCLK for horizontal interpolation (Box 630).

Employing the desired interpolation method, the horizontal interpolation (Box 650) scales each group of pixels of each horizontal row to generate the scaled source graphic image pixel data at the rate of the destination clock DCLK in a manner equivalent to the horizontal interpolation (Box 630).

The pixels $SR_{n-1}$ and $SR_{n-1}$ of the source graphic image pixel data, the interpolated pixels HSCALE_1 is stored (Box 635) in the FIFO at the rate of the source clock SCLK, when the interpolation coefficients C1, C2, C3, and C4 are all non-zero. If the interpolation coefficients C1 and C2 are set equal to zero, there is not interpolation between the horizontal pixels of the source graphic image pixel data and these pixels are transferred (Box 655) directly to the interpolated processed image storage memory at the rate of the destination clock DCLK. When several rows of the horizontally interpolated source graphic image pixel data are written to the interpolated processed image storage memory, the rows of the horizontally interpolated source graphic image pixel data necessary for the vertical interpolation (Box 660) are read interpolated processed image storage memory for vertical interpolation (Box 660).

When sufficient rows of the horizontally interpolated source graphic image pixel data are stored in the interpolated processed image storage memory, the vertical interpolation (Box 660) reads two lines from the interpolated processed image storage memory to a shift register. The shift register reads each vertical pair of pixels of the horizontally interpolated source graphic image pixel data for vertical interpolation (Box 660). The vertical interpolation (Box 640) then generates, at the rate of the destination clock DCLK, an interpolated pixel to be placed vertically between the two pixels of the horizontally interpolated source graphic image pixel data. The vertical interpolation uses the vertical scale 604 from the scale generation (Box 600) and generates the interpolated pixel according to the formula of the vertical interpolation (Box 640).

It should be noted, as described above, that the up-scaling ratio of the vertical scaling factor 604 can be different from the up-scaling ratio of the horizontal scaling factor 602 and is not limited to a factor of two as confined in horizontal interpolator. Further, the interpolation coefficients VC1 and VC2 of the vertical scaling factor 604 may be the appropriate scaling factors for any appropriate interpolation methods such as linear interpolation, bilinear interpolation methods, bicubic interpolation methods, triangulation interpolation methods, tetrahedrization interpolation methods, inverse distance weighted interpolation methods, radial basis function interpolation methods; or natural neighbor interpolation methods. It should be further noted that the scaling factors are not limited to factors of two as shown for the horizontal interpolation (Box 650), but may be any scaling factor to provide the appropriate up-scaling of the source graphic image pixel data.

Upon completion of the vertical interpolation (Box 640) or (Box 660), the horizontally and vertically interpolated source graphic image pixel data is transmitted (Box 665) as the destination image pixel data to the display controller at the rate of the destination clock DCLK. The display controller then converts the destination image pixel data to the necessary drive and control signals for the display.

While this invention has been particularly shown and described with reference to the preferred embodiments thereof, it will be understood by those skilled in the art that various changes in form and details may be made without departing from the spirit and scope of the invention.

The invention claimed is:

1. A graphic up-scaling apparatus connected to receive source image pixel data describing pixel intensity for pixels arranged in first dimensional ranks and second dimensional ranks, up-scale said source image pixel data to a higher pixel density for the first and second dimensional rank, and to transmit destination graphic pixel data that is the up-scaled source image data to a display, said graphic up-scaling apparatus comprising:
   a first dimensional rank interpolator circuit connected to receive said source pixel data synchronized at a first clock rate and to interpolate groups of pixels of each first dimensional rank of said source pixel data at a second clock rate;
   a first dimensional rank interpolated storage device in communication with said first dimensional rank interpolator to receive and retain interpolated source pixel data of each first dimensional rank of the source pixel data at said second clock rate; and
   a second dimensional rank interpolator circuit in communication with said first dimensional rank interpolated storage device to extract said interpolated source pixel data of each first dimensional rank of the source pixel data at a third clock rate, interpolate groupings of said interpolated source pixel data of each first dimensional rank of the source pixel data at said third clock rate, and transmit said destination graphic pixel data for display.

2. The graphic up-scaling apparatus of claim 1 wherein said second clock rate is equal to the first clock rate such that said first dimensional rank interpolator interpolates said source pixel data at the first clock rate.

3. The graphic up-scaling apparatus of claim 1 wherein said second clock rate is equal to a faster of the first clock rate and the third clock rate such that said first dimensional rank interpolator interpolates said source pixel data at said fastest of said first clock rate and said third clock rate.

4. The graphic up-scaling apparatus of claim 1 wherein the third clock rate synchronizes said destination graphical pixel data for communication said destination graphical pixel data with said display.

5. The graphic up-scaling apparatus of claim 1 wherein said first dimensional rank interpolator circuit receives a first dimensional rank scaling factor by which groups of pixels of each first dimensional rank of said source pixel data are interpolated.

6. The graphic up-scaling apparatus of claim 1 wherein said second dimensional rank interpolator circuit receives a second dimensional rank scaling factor by which groupings of said interpolated source pixel data of each first dimensional rank of the source pixel data are interpolated.

7. The graphic up-scaling apparatus of claim 1 further comprising a source pixel data synchronizer connected to receive said source pixel data, synchronize said source pixel data at the first clock rate, and communicate the synchronized source pixel data to the first dimensional rank interpolator.

8. The graphic up-scaling apparatus of claim 1 further comprising a first-in-first-out serial memory buffer connected to buffer said source pixel data interpolated by said first dimensional rank interpolator as said interpolated source pixel data is placed in said first dimensional rank interpolated storage device.

9. The graphic up-scaling apparatus of claim 7 further comprising a first-in-first-out serial memory buffer connected to buffer said source pixel data as it is transmitted from said source pixel data synchronizer to said first dimensional rank interpolator.

10. The graphic up-scaling apparatus of claim 1 further comprising a clock selector to determine the whether the first clock rate is faster than the third clock rate and set said third clock rate to the faster of the first clock rate and the third clock rate such that the first dimensional rank interpolator interpolates said source pixel data at the faster of the first clock rate and the third clock rate.

11. The graphic up-scaling apparatus of claim 1 wherein the first dimensional rank interpolator and the second rank interpolator employ an interpolation method selected from a group of interpolation methods consisting of linear interpolation, bilinear interpolation methods, bicubic interpolation methods, triangulation interpolation methods, tetrahedrization interpolation methods, inverse distance weighted interpolation methods, radial basis function interpolation methods; and natural neighbor interpolation methods.

12. The graphic up-scaling apparatus of claim 1 wherein said first dimensional rank is a horizontal row and said second dimensional rank is a vertical column where source image pixel data is transferred and interpolated sequentially for each horizontal row vertically until an entire image has been interpolated.

13. A graphic display adapter that receives graphic signals with a first resolution less than a second resolution of graphic signals required by a display device in communication with said display adapter, comprising:
    a graphic up-scaling apparatus connected to receive source image pixel data of said graphic signals describing pixel intensity for pixels arranged in first dimensional ranks and second dimensional ranks, up-scale said source image pixel data to a higher pixel density for the first and second dimensional rank, and to transmit destination graphic pixel data that is the up-scaled source image data to a display, said graphic up-scaling apparatus comprising:
        a first dimensional rank interpolator circuit connected to receive said source pixel data synchronized at a first clock rate and to interpolate groups of pixels of each first dimensional rank of said source pixel data at a second clock rate,
        a first dimensional rank interpolated storage device in communication with said first dimensional rank interpolator to receive and retain interpolated source pixel data of each first dimensional rank of the source pixel data at said second clock rate, and
        a second dimensional rank interpolator circuit in communication with said first dimensional rank interpolated storage device to extract said interpolated source pixel data of each first dimensional rank of the source pixel data at a third clock rate, interpolate groupings of said interpolated source pixel data of each first dimensional rank of the source pixel data at said third clock rate, and transmit said destination graphic pixel data for display.

14. The graphic display adapter of claim 13 wherein said second clock rate is equal to the first clock rate such that said first dimensional rank interpolator interpolates said source pixel data at the first clock rate.

15. The graphic display adapter of claim 13 wherein said second clock rate is equal to a faster of the first clock rate and the third clock rate such that said first dimensional rank interpolator interpolates said source pixel data at said faster of said first clock rate and said third clock rate.

16. The graphic display adapter of claim 13 wherein the third clock rate synchronizes said destination graphical pixel data for communication said destination graphical pixel data with said display.

17. The graphic display adapter of claim 13 further comprising a first dimensional rank generator in communication with said first dimensional rank interpolator circuit to generate and provide a first dimensional rank scaling factor by which groups of pixels of each first dimensional rank of said source pixel data are interpolated.

18. The graphic display adapter of claim 13 further comprising a second dimensional rank generator in communication with said second dimensional rank interpolator circuit to generate and provide a second dimensional rank scaling factor by which groupings of said interpolated source pixel data of each first dimensional rank of the source pixel data are interpolated.

19. The graphic display adapter of claim 13 further comprising a clock rate generator to provide a first clock signal with said first clock rate and a second clock signal with said second clock rate communicated to said graphic up-scaling apparatus to synchronize said source pixel data, interpolate on the first dimensional rank and interpolate on the second dimensional rank said source pixel data.

20. The graphic display adapter of claim 13 further comprising a source pixel data synchronizer connected to receive said source pixel data, synchronize said source pixel data at the first clock rate, and communicate the synchronized source pixel data to the first dimensional rank interpolator.

21. The graphic display adapter of claim 13 wherein the graphic up-scaling apparatus further comprises a first-in-first-out serial memory buffer connected to buffer said source pixel data interpolated by said first dimensional rank interpolator as said interpolated source pixel data is placed in said first dimensional rank interpolated storage device.

22. The graphic up-scaling apparatus of claim 13 wherein graphic up-scaling apparatus further comprises a first-in-first-out serial memory buffer connected to buffer said source pixel data as it is transmitted from said source pixel data synchronizer to said first dimensional rank interpolator.

23. The graphic display adapter of claim 13 wherein graphic up-scaling apparatus graphic up-scaling apparatus further comprises a clock selector to determine the whether the first clock rate is faster than the third clock rate and set said third clock rate to the faster of the first clock rate and the third clock rate such that the first dimensional rank interpolator interpolates said source pixel data at the faster of the first clock rate and the third clock rate.

24. The graphic display adapter of claim 13 wherein the first dimensional rank interpolator and the second rank interpolator employ an interpolation method selected from a group of interpolation methods consisting of linear interpolation, bilinear interpolation methods, bicubic interpolation methods, triangulation interpolation methods, tetrahedrization interpolation methods, inverse distance weighted interpolation methods, radial basis function interpolation methods; and natural neighbor interpolation methods.

25. The graphic display adapter of claim 13 wherein said first dimensional rank is a horizontal row and said second dimensional rank is a vertical column where source image pixel data is transferred and interpolated sequentially for each horizontal row vertically until an entire image has been interpolated.

26. A method for up-scaling source image pixel data describing pixel intensity for image pixels of a display arranged in first dimensional ranks and second dimensional ranks, to a higher pixel density for the first and second dimensional rank for presentation on a display device with said higher pixel density, said method comprising the steps of:
acquiring said source image pixel data;
synchronizing said source pixel data at a first clock rate;
interpolating groups of said source pixel data on said first dimensional rank at a second clock rate;
storing interpolated source pixel data of each first dimensional rank of the source pixel data at said second clock rate; interpolating groupings of said interpolated source pixel data of each first dimensional rank of the source pixel data at a third clock rate; and
transmitting destination graphic pixel data that is the up-scaled source image data for display.

27. The method for up-scaling source image pixel data of claim 26 wherein said second clock rate is equal to the first clock rate such that said first dimensional rank interpolator interpolates said source pixel data at the first clock rate.

28. The method for up-scaling source image pixel data of claim 26 wherein said second clock rate is equal to a faster of the first clock rate and the third clock rate such that said first dimensional rank interpolator interpolates said source pixel data at said fastest of said first clock rate and said third clock rate.

29. The method for up-scaling source image pixel data of claim 26 wherein the third clock rate synchronizes said destination graphical pixel data for communication said destination graphical pixel data with said display.

30. The method for up-scaling source image pixel data of claim 26 further comprising the step of receiving a first dimensional rank scaling factor by which groups of pixels of each first dimensional rank of said source pixel data are interpolated.

31. The method for up-scaling source image pixel data of claim 26 further comprising the step of receiving a second dimensional rank scaling factor by which groupings of said interpolated source pixel data of each grouping of the first dimensional rank of the source pixel data are interpolated.

32. The method for up-scaling source image pixel data of claim 26 wherein acquiring said source image pixel data comprises the step of receiving said source image pixel data at the first clock rate.

33. The method for up-scaling source image pixel data of claim 26 further comprising the steps of:
determining whether the first clock rate is faster than the third clock rate; and
setting said third clock rate to the faster of the first clock rate and the third clock rate such that the first dimensional rank interpolator interpolates said source pixel data at the faster of the first clock rate and the third clock rate.

34. The method for up-scaling source image pixel data of claim 26 wherein interpolating on the first dimensional rank and interpolating on the second rank is accomplished by an interpolation method selected from a group of interpolation methods consisting of linear interpolation, bilinear interpolation methods, bicubic interpolation methods, triangulation interpolation methods, tetrahedrization interpolation methods, inverse distance weighted interpolation methods, radial basis function interpolation methods; and natural neighbor interpolation methods.

35. The method for up-scaling source image pixel data of claim 26 wherein said first dimensional rank is a horizontal row and said second dimensional rank is a vertical column where source image pixel data is transferred and interpolated sequentially for each horizontal row vertically until an entire image has been interpolated.

36. An apparatus for up-scaling source image pixel data describing pixel intensity for image pixels of a display arranged in first dimensional ranks and second dimensional ranks, to a higher pixel density for the first and second dimensional rank for presentation on a display device with said higher pixel density, said apparatus comprising:
means for acquiring said source image pixel data;
means for synchronizing said source pixel data at a first clock rate;
means for interpolating groups of said source pixel data on said first dimensional rank at a second clock rate;
means for storing interpolated source pixel data of each first dimensional rank of the source pixel data at said second clock rate; interpolating groupings of said interpolated source pixel data of each first dimensional rank of the source pixel data at a third clock rate; and
means for transmitting destination graphic pixel data that is the up-scaled source image data for display.

37. The apparatus for up-scaling source image pixel data of claim 35 wherein said second clock rate is equal to the first clock rate such that said first dimensional rank interpolator interpolates said source pixel data at the first clock rate.

38. The apparatus for up-scaling source image pixel data of claim 35 wherein said second clock rate is equal to a faster of the first clock rate and the third clock rate such that said first dimensional rank interpolator interpolates said source pixel data at said fastest of said first clock rate and said third clock rate.

39. The apparatus for up-scaling source image pixel data of claim 35 wherein the third clock rate synchronizes said destination graphical pixel data for communication said destination graphical pixel data with said display.

40. The apparatus for up-scaling source image pixel data of claim 35 further comprising means for receiving a first dimensional rank scaling factor by which groups of pixels of each first dimensional rank of said source pixel data are interpolated.

41. The apparatus for up-scaling source image pixel data of claim 35 further comprising means for receiving a second dimensional rank scaling factor by which groupings of said interpolated source pixel data of each grouping of the first dimensional rank of the source pixel data are interpolated.

42. The apparatus for up-scaling source image pixel data of claim 35 wherein means for acquiring said source image pixel data comprises means for receiving said source image pixel data at the first clock rate.

43. The apparatus for up-scaling source image pixel data of claim 35 further comprising:
means for determining whether the first clock rate is faster than the third clock rate; and
means for selling said third clock rate to the faster of the first clock rate and the third clock rate such that the first dimensional rank interpolator interpolates said source pixel data at the faster of the first clock rate and the third clock rate.

44. The apparatus for up-scaling source image pixel data of claim 35 wherein interpolating on the first dimensional rank and interpolating on the second rank is accomplished by an interpolation method selected from a group of interpolation methods consisting of linear interpolation, bilinear interpolation methods, bicubic interpolation methods, triangulation interpolation methods, tetrahedrization interpolation methods, inverse distance weighted interpolation methods, radial basis function interpolation methods; and natural neighbor interpolation methods.

45. The apparatus for up-scaling source image pixel data of claim 35 wherein said first dimensional rank is a horizontal row and said second dimensional rank is a vertical column where source image pixel data is transferred and interpolated sequentially for each horizontal row vertically until an entire image has been interpolated.

46. A computer readable medium having a computer executable program code embodied thereon such that when the program code is executed on a computing system, the program code instructs the computing system to execute a program process for up-scaling source image pixel data describing pixel intensity for image pixels of a display arranged in first dimensional ranks and second dimensional ranks, to a higher pixel density for the first and second dimensional rank for presentation on a display device with said higher pixel density, said program process comprising the steps of:
 acquiring said source image pixel data;
 synchronizing said source pixel data at a first clock rate;
 interpolating groups of said source pixel data on said first dimensional rank at a second clock rate;
 storing interpolated source pixel data of each first dimensional rank of the source pixel data at said second clock rate; interpolating groupings of said interpolated source pixel data of each first dimensional rank of the source pixel data at a third clock rate; and
 transmitting said destination graphic pixel data that is the up-scaled source image data for display.

47. The computer readable medium having a computer executable program code embodied thereon of claim 46 wherein said second clock rate is equal to the first clock rate such that said first dimensional rank interpolator interpolates said source pixel data at the first clock rate.

48. The computer readable medium having a computer executable program code embodied thereon of claim 46 wherein said second clock rate is equal to a faster of the first clock rate and the third clock rate such that said first dimensional rank interpolator interpolates said source pixel data at said fastest of said first clock rate and said third clock rate.

49. The computer readable medium having a computer executable program code embodied thereon of claim 46 wherein the third clock rate synchronizes said destination graphical pixel data for communication said destination graphical pixel data with said display.

50. The computer readable medium having a computer executable program code embodied thereon of claim 46 wherein the process for up-scaling source image pixel data further comprises the step of receiving a first dimensional rank scaling factor by which groups of pixels of each first dimensional rank of said source pixel data are interpolated.

51. The computer readable medium having a computer executable program code embodied thereon of claim 46 wherein the process for up-scaling source image pixel data further comprising the step of receiving a second dimensional rank scaling factor by which groupings of said interpolated source pixel data of each grouping of the first dimensional rank of the source pixel data are interpolated.

52. The computer readable medium having a computer executable program code embodied thereon of claim 46 wherein acquiring said source image pixel data comprises the step of receiving said source image pixel data at the first clock rate.

53. The computer readable medium having a computer executable program code embodied thereon of claim 46 wherein the process for up-scaling source image pixel data further comprises the steps of:
 determining whether the first clock rate is faster than the third clock rate; and
 setting said third clock rate to the faster of the first clock rate and the third clock rate such that the first dimensional rank interpolator interpolates said source pixel data at the faster of the first clock rate and the third clock rate.

54. The computer readable medium having a computer executable program code embodied thereon of claim 46 wherein interpolating on the first dimensional rank and interpolating on the second rank is accomplished by an interpolation method selected from a group of interpolation methods consisting of linear interpolation, bilinear interpolation methods, bicubic interpolation methods, triangulation interpolation methods, tetrahedrization interpolation methods, inverse distance weighted interpolation methods, radial basis function interpolation methods; and natural neighbor interpolation methods.

55. The computer readable medium having a computer executable program code embodied thereon of claim 46 wherein said first dimensional rank is a horizontal row and said second dimensional rank is a vertical column where source image pixel data is transferred and interpolated sequentially for each horizontal row vertically until an entire image has been interpolated.

* * * * *